(12) United States Patent
Yano et al.

(10) Patent No.: US 6,282,483 B1
(45) Date of Patent: Aug. 28, 2001

(54) FOLLOW-UP CRUISE CONTROL APPARATUS

(75) Inventors: Takuto Yano; Minoru Nishida, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,422

(22) Filed: Jul. 28, 2000

(30) Foreign Application Priority Data

Jan. 11, 2000 (JP) .................................................. 12-002474

(51) Int. Cl.[7] ............................. B60K 31/00; G01S 13/93
(52) U.S. Cl. ............................. 701/96; 701/301; 340/903; 340/435
(58) Field of Search .......................... 701/96, 93, 300, 701/301, 302; 340/903, 435, 436; 367/99, 103

(56) References Cited

U.S. PATENT DOCUMENTS 5,761,629 * 6/1998 Gilling ................................... 701/96

FOREIGN PATENT DOCUMENTS 5-342500 12/1993 (JP) .
10 338055 12/1998 (JP) .

* cited by examiner

Primary Examiner—Tan Nguyen
(74) Attorney, Agent, or Firm—Sughrue, Mion, Zinn, Macpeak & Seas, PLLC

(57) ABSTRACT

To maintain a predetermined distance to each of obstacles ahead of own vehicle, a follow-up cruise control apparatus calculates traveling direction target acceleration and deceleration of own vehicle, and treats, as s safe acceleration and deceleration, the product of the traveling direction target acceleration and deceleration and a weight coefficient determined by a distance between the front obstacle and the center line of the course of own vehicle. The follow-up cruise control apparatus selects a front obstacle having a safe acceleration and deceleration with the highest degree of risk of collision, from among all front obstacles ahead of own vehicle. Based on the safe acceleration and deceleration of the front obstacle, the follow-up cruise control apparatus prevents own vehicle from dangerously closely approaching or colliding with the front obstacle by restricting the driving power of own vehicle typically determined by an acceleration operation by a driver or by amplifying the braking power of own vehicle typically determined by a braking operation by the driver.

15 Claims, 21 Drawing Sheets

FOLLOW-UP CRUISE CONTROL APPARATUS

BACKGROUND OF THE INVENTION

1. Field of the Invention

The present invention relates to a follow-up cruise control apparatus which prevents a collision with an obstacle ahead by detecting distances to front obstacles (including vehicles) present in a front area ahead of own vehicle including a straight-ahead course of own vehicle to correct a driving power or a braking power through a driver's pedaling action, or automatically controls the distance to the obstacle by controlling the driving power or the braking power of own vehicle.

2. Description of the Related Art

There have been conventionally proposed apparatuses which select a vehicle to be followed-up, from among obstacles ahead detected through radar, to assure own vehicle to safely cruise without the risk of collision with the obstacles.

Japanese Unexamined Patent Publication No. 5-342500 discloses such an apparatus. This apparatus is provided with a radar which scans a predetermined sector angle by emitting an electromagnetic wave in a traveling direction of own vehicle, and measures a distance to a reflective body based on a travel time which the electromagnetic wave takes to return back to the radar. The radar also detects reflectors arranged along one side of a lane, from among a plurality of reflective bodies. A lane estimating unit estimates the configuration of the lane based on the layout of a group of reflectors. A vehicle recognition unit recognizes the vehicles present ahead of own vehicle from among the reflective bodies. A lane determining unit determines whether the front vehicles recognized are present in the same lane as that of own vehicle. A vehicle-to-vehicle distance output unit outputs a vehicle-to-vehicle distance to the vehicle closest to own vehicle from among the vehicles present in the same lane.

The apparatus selects an obstacle A ahead of own vehicle as a vehicle of interest to be followed-up when own vehicle, and obstacles A and B run in two separate lanes under a condition (condition 1) as shown in FIG. 32A. Under the condition 1, the obstacle A is the one which the driver intends to follow, and the driver may be at ease with own vehicle which is controlled with the front obstacle A handled as a vehicle to be followed-up.

In FIG. 32B, own vehicle and an obstacle C run in the same lane with the obstacle C handled as a vehicle to be followed-up by own vehicle. Under a condition 2, an obstacle D now attempts to somewhat forcibly enter between own vehicle and the obstacle C. Own vehicle cannot change to the front obstacle D from the vehicle to be followed-up (the front obstacle C) under the condition 2 until the obstacle D has completed the change of lane. In this case, the drive may feel a chill, worrying about the risk of a collision.

Referring to FIG. 32C, own vehicle and the front obstacle E are now running in the same lane. The obstacle E is the vehicle to be followed-up by own vehicle. Under a condition 3, own vehicle now attempts to change to the lane in which an obstacle F is now running. Under the condition 3, own vehicle cannot switch the vehicle to be followed-up from the obstacle E to the obstacle F until own vehicle determines that the front obstacle F is running in the same lane of own vehicle's. As under the condition 2, the driver may also be ill at ease under the condition 3, as well.

Under the conditions 2 and 3, own vehicle must select, as a vehicle to be followed-up, in follow-up control, a vehicle having the highest degree of risk of collision with own vehicle, from among a plurality of front obstacles, rather than selecting a vehicle based on whether the vehicle runs in the same lane. The risk of collision needs to be determined referring to the following factors in the relative positional relationship between own vehicle and the front obstacles.

Relative distance of own vehicle in the travel direction thereof (hereinafter referred to as a traveling direction distance)

Relative speed of own vehicle in the travel direction (hereinafter referred to as a traveling direction relative speed)

Relative distance in a direction perpendicular to the travel direction of own vehicle (hereinafter referred to as a lateral distance)

Relative speed in a direction perpendicular to the travel direction of own vehicle (hereinafter referred to as a lateral speed), and further, Acceleration and deceleration of the front obstacle Configuration of a road, and Relative position of own vehicle and the front obstacle with respect to a lane.

Japanese Unexamined Patent Publication No. 10-338055 discloses an apparatus which is free from the problems encountered under the conditions 2 and 3. This apparatus, provided with a vehicle-to-vehicle distance sensor for measuring a distance between own vehicle and each of a plurality of front obstacles, sets a target vehicle-to-vehicle distance to each of the plurality of the front obstacles, and calculates an acceleration and deceleration to each front obstacle from a difference between the vehicle-to-vehicle distance and the corresponding target vehicle-to-vehicle distance. By processing an image of the front obstacles picked up by a CCD (Charge-Coupled Device) camera, the apparatus detects the change of lane by own vehicle or by any of the front obstacles. The apparatus selects a minimum target acceleration and deceleration, and controls the engine output and braking power of own vehicle in accordance with the target acceleration and deceleration.

When the front obstacle D attempts to forcibly enter between own vehicle and the obstacle C under the condition 2, the apparatus selects, as a vehicle to be followed-up, either the obstacle C or the obstacle D, whichever exhibits smaller acceleration and deceleration. If the obstacle D applies the brake, own vehicle has a higher risk of collision with the obstacle D than with the obstacle C. The obstacle D exhibits smaller target acceleration and deceleration than the obstacle C, and the vehicle to be followed-up is immediately switched from the obstacle C to the obstacle D. This arrangement frees the driver from feeling a chill from the risk of collision.

When own vehicle changes to the next lane, in which the front obstacle F is running, under the condition 3, the apparatus selects, as the vehicle to be followed-up, the front obstacle E or the front obstacle F, whichever exhibits smaller target acceleration and deceleration. If the obstacle F applies the brake, own vehicle runs a higher risk of collision with the obstacle F than with the obstacle E. The front obstacle F exhibits smaller target acceleration and deceleration than the front obstacle E, and the vehicle to be followed-up is immediately shifted from the front target E to the front target F. In the same way as under the condition 2, the apparatus frees the driver from feeling a chill from the risk of collision.

As discussed above, the apparatus, disclosed in Japanese Unexamined Patent Publication No. 10-338055, employs detecting means for detecting the change of lane by a front obstacle and detecting means for detecting the change of lane by own vehicle. The two means play a vital role in the determination of the switching timing of the vehicle to be followed-up, therefore, in freeing the driver from feeling a chill from the risk of collision. The disclosure fails to describe in detail how the detecting means for detecting the change of lane by a front obstacle and detecting means for detecting the change of lane by own vehicle are embodied. Since the disclosed apparatus detects the change of lane by the obstacle and own vehicle using a CCD camera rather than a vehicle-to-vehicle sensor, the apparatus and the processing steps carried out by the apparatus become extremely complicated.

SUMMARY OF THE INVENTION

Accordingly, it is an object of the present invention to provide a follow-up cruise control apparatus which selects, as a vehicle to be followed-up, a vehicle presenting a highest degree of risk of collision under the conditions 1 through 3, to free the driver from feeling a chill at the risk of collision, while dispensing with means for detecting the change of line by own vehicle and front obstacles, and which has a simplified structure and processing.

A follow-up cruise control apparatus of the present invention, in an aspect, includes a vehicle-to-vehicle distance sensor for detecting a relative distance of own vehicle to each of front obstacles including a plurality of vehicles present ahead of own vehicle, a speed sensor for detecting a speed of own vehicle, a traveling direction target acceleration and deceleration calculating unit for calculating traveling direction target acceleration and deceleration to optimize a distance to the front obstacle, based on the own vehicle speed and the relative distance to the front obstacle, a safe acceleration and deceleration calculating unit for calculating a safe acceleration and deceleration indicating the degree of risk of collision with the front obstacle, based on, at least, the traveling direction acceleration and deceleration, a unit for applying the traveling direction target acceleration and deceleration calculating unit and the safe acceleration and deceleration calculating unit to each of the plurality of front obstacles, detected by the vehicle-to-vehicle distance sensor, a front obstacle selecting unit for selecting a front obstacle having a safe acceleration and deceleration with the highest degree of risk of collision, from among the plurality of the front obstacles, and a vehicle control unit for controlling a driving power or a braking power of own vehicle, based on, at least, the safe acceleration and deceleration or the traveling direction target acceleration and deceleration, to the front obstacle selected by the front obstacle selecting unit.

The vehicle control unit preferably includes an actuator for electrically adjusting the driving power of own vehicle to control own vehicle to a specified target driving power, an acceleration and deceleration calculating unit for calculating an acceleration and deceleration based on the speed of own vehicle, an acceleration-state detection element for detecting an acceleration control amount input by a driver, a target driving power calculating unit for calculating the target driving power, based on at least the acceleration and deceleration of own vehicle, the acceleration control amount, and the safe acceleration and deceleration or the traveling direction target acceleration and deceleration, to the front obstacle selected by the front obstacle selecting unit, and an output unit for outputting the target driving power to the actuator.

The vehicle control unit preferably includes an actuator for electrically adjusting the braking power of own vehicle to control own vehicle to a specified target braking power, an acceleration and deceleration calculating unit for calculating an acceleration and deceleration based on the speed of own vehicle, a braking-state detection element for detecting a brake control amount input by a driver, a target braking power calculating unit for calculating the target braking power, based on, at least, the acceleration and deceleration of own vehicle, the brake control amount, and the safe acceleration and deceleration or the traveling direction target acceleration and deceleration, to the front obstacle selected by the front obstacle selecting unit, and an output unit for outputting the target braking power to the actuator.

The vehicle control unit preferably includes an actuator for electrically adjusting the driving power of own vehicle to control own vehicle to a specified target driving power, a target driving power calculating unit for calculating the target driving power to control own vehicle to, at least, the safe acceleration and deceleration or the traveling direction target acceleration and deceleration, to the front obstacle selected by the front obstacle selecting unit, and an output unit for outputting the target driving power to the actuator.

The vehicle control unit preferably includes an actuator for electrically adjusting the braking power of own vehicle to control own vehicle to a specified target braking power, a target braking power calculating unit for calculating a target braking power to control own vehicle to, at least, the safe acceleration and deceleration or the traveling direction target acceleration and deceleration, to the front obstacle selected by the front obstacle selecting unit, and an output unit for outputting the target braking power to the actuator.

The safe acceleration and deceleration calculating unit preferably includes a weight coefficient calculating unit for calculating a weight coefficient based on, at least, the relative distance to the front obstacle, and a unit for correcting the traveling direction target acceleration and deceleration by the weight coefficient and treating the corrected value as the safe acceleration and deceleration.

The weight coefficient calculating unit preferably includes a yaw-rate sensor for detecting a yaw rate of own vehicle, a course calculating unit for calculating an orbital curve along which own vehicle runs at least at the yaw rate, and a unit for calculating the weight coefficient based on at least a distance between the orbital curve and a front obstacle.

The weight coefficient calculating unit preferably includes a yaw-rate sensor for detecting a yaw rate of own vehicle, a distance calculating unit for calculating a predicted distance to the front obstacle in a lateral direction a predetermined duration of time later, based on at least the yaw rate and the output signal from the vehicle-to-vehicle distance sensor, and a unit for calculating the weight coefficient, based on the predicted distance to the front obstacle the predetermined duration of time later.

The predetermined duration of time is preferably a predicted time to a collision with the front obstacle.

The predetermined duration of time is preferably based on the speed of own vehicle.

The acceleration and deceleration calculating unit preferably includes an acceleration-state detection element for detecting an acceleration control amount input by a driver, and a calculating unit for calculating the acceleration and deceleration of own vehicle, in response to at least an acceleration operation by a driver.

The acceleration and deceleration calculating unit preferably includes a braking-state detection element for detecting a braking control amount input by a driver, and a calculating unit for calculating the acceleration and deceleration of own vehicle, in response to at least an braking operation by a driver.

The follow-up cruise control apparatus of the present invention preferably includes a steering angle sensor for detecting a steering control amount input by a driver, instead of the yaw-rate sensor, and a calculating unit for calculating the yaw rate of own vehicle, based on the steering control amount.

The follow-up cruise control apparatus of the present invention preferably includes a vehicle-to-vehicle distance sensor which concurrently detects the distance to the front obstacle and the relative speed to the front obstacle.

DESCRIPTION OF THE PREFERRED EMBODIMENTS

Figure 1:
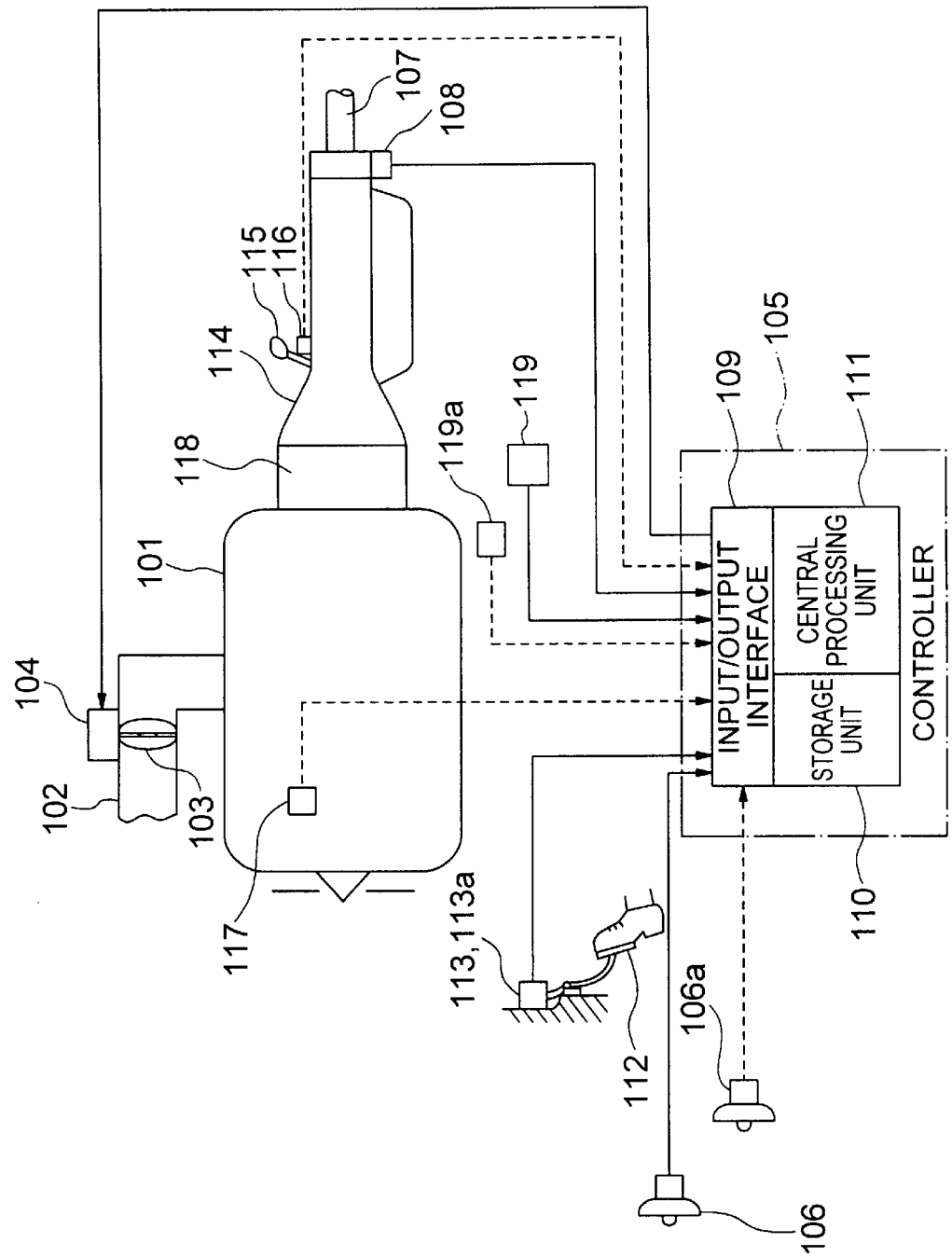
FIG. 1 is a system block diagram showing a follow-up cruising control apparatus of a first embodiment of the present invention.

Referring to the drawings, the embodiments of the present invention are now discussed.

First Embodiment

FIG. 1 is a block diagram of a follow-up cruise control apparatus of a first embodiment of the present invention. There are shown an engine 101 and an automatic transmission 114. A throttle valve 103 is arranged in an intake pipe 102 connected to the engine 101 to adjust air intake quantity to the engine 101. The throttle valve 103 is connected to a throttle actuator 104. By driving the throttle actuator 104, the opening of the throttle valve 103, therefore, the output of the engine 101, is controlled.

The throttle actuator 104 is driven by a signal from a controller 105. The controller 105 receives signals from sensors and switches in modules in a vehicle, including the engine 101 and the automatic transmission 114. The sensors and the switches include a speed sensor 108 for detecting the RPM (revolutions per minute) of an output shaft 107 of the automatic transmission 114, proportional to the speed of own vehicle, an accelerator opening sensor 113 for detecting the angle of an acceleration pedal 112, a vehicle-to-vehicle distance sensor 106 for detecting a distance to a front obstacle in the travel direction of own vehicle based on the reflected state of a radio wave or light reflected from the front obstacle, and a yaw-rate sensor 119 for detecting a yaw rate of own vehicle. The controller 105 includes a central processing unit 111 constituting a known microcomputer, a storage unit 110, an input and output interface 109, etc.

The operation of the follow-up cruise control apparatus thus constructed is briefly discussed. When the driver puts his or her foot down on the acceleration pedal 112, the accelerator opening sensor 113 detects a pedal travel and sends the pedal travel value to the controller 105. The vehicle-to-vehicle distance sensor 106 measures the distance to the front obstacle in the traveling direction of own vehicle, and sends the distance value to the controller 105. When the controller 105 determines that own vehicle maintains a sufficiently safe distance to the front obstacle based on the distance to the front obstacle, the controller 105 drives the throttle actuator 104 by a quantity responsive to the pedal travel of the acceleration pedal 112, thereby adjusting the opening of the throttle valve 103. When the controller 105 determines that own vehicle has no safe distance to the front obstacle, the controller 105 drives the throttle actuator 104 by a quantity responsive to the acceleration pedal travel (=accelerator opening) of the acceleration pedal 112 and a safe acceleration and deceleration corresponding to the distance to the front obstacle, thereby limiting the opening of the throttle valve 103.

Figure 2:
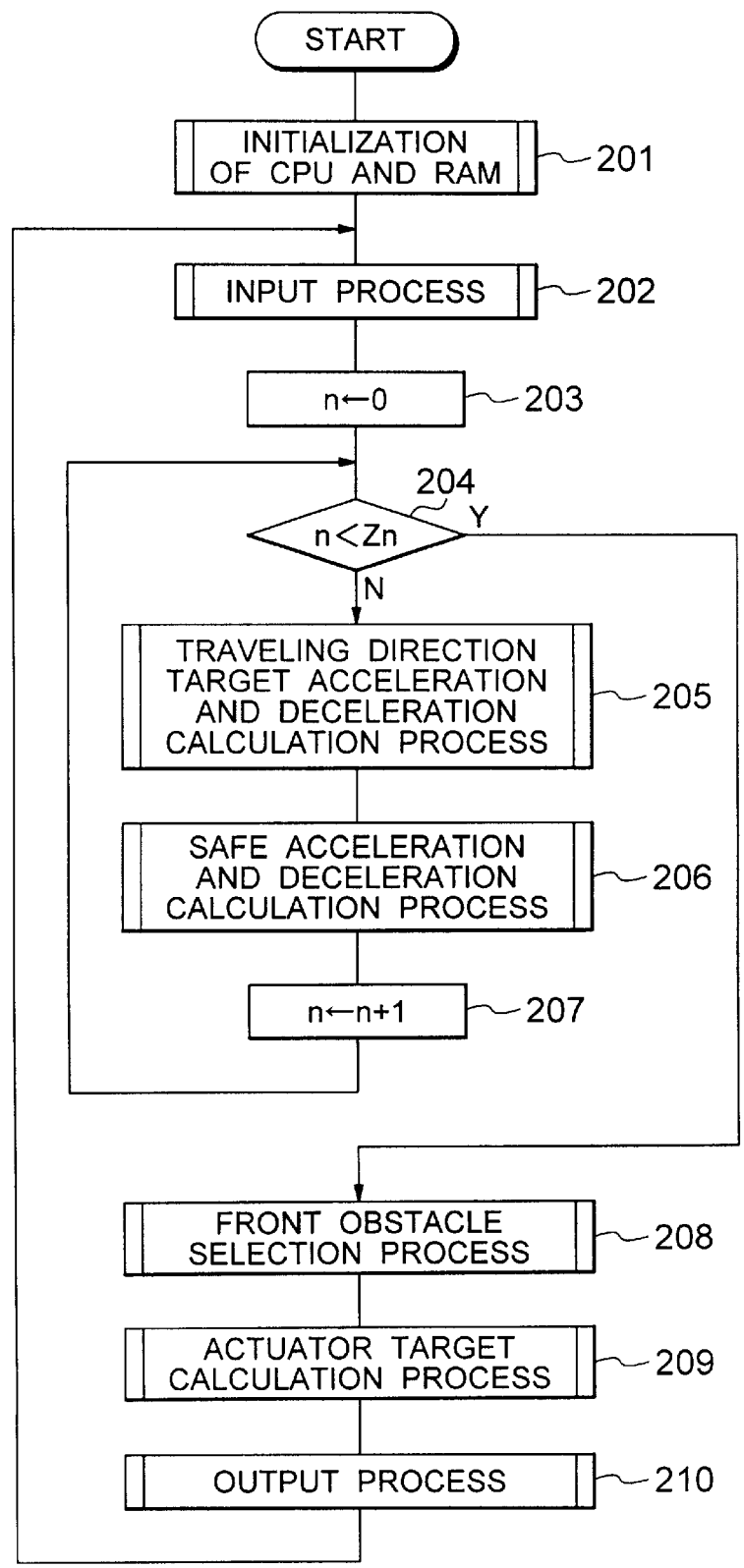
FIG. 2 is a flow diagram showing a main routine of a program of the first embodiment of the present invention.

Discussed next is the flow of a program stored in the storage unit 110 and executed by the central processing unit 111 in the controller 105. FIG. 2 is a flow diagram showing a main routine of the program, which is repeatedly executed every predetermined intervals, for instance, every 20 ms. Zaccel, ZVs, Zx(n), Zy(n), ZAs, Zr, ZVr, VAp, ZAtarget(n), Zxtarget, ZdA, Zweight, Zα(n), ZdisLat, ZR, Zdy, Zntarget, Zα, n, and Zth are variables stored in the storage unit 110 and are readable and rewritable, and $Xk_1$, $Xk_2$, Xαinfinity, and Xα are data beforehand stored in the storage unit 110 and readable but not rewritable.

Figure 3:
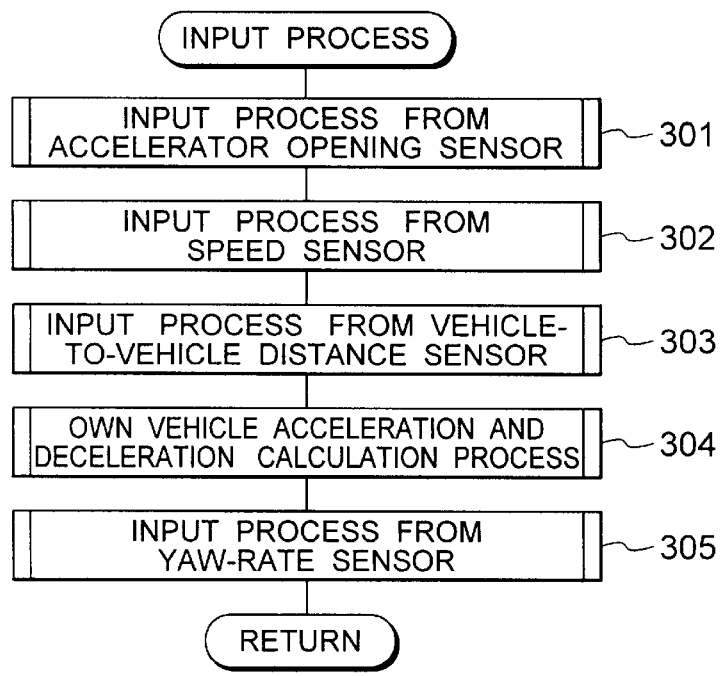
FIG. 3 is a flow diagram of an input process of the first embodiment of the present invention.

In step 201, the variables are initialized. In step 202, the controller 105 receives statuses of the sensors and switches connected thereto. Specifically, input processes are performed as illustrated in FIG. 3.

In step 301, the controller 105 receives a signal from the accelerator opening sensor 113, and stores the signal as an accelerator opening Zaccel of the acceleration pedal 112. In step 302, the controller 105 receives a speed signal from the speed sensor 108, and stores the speed signal as an own vehicle speed ZVs. In step S303, the controller 105 receives a signal from the vehicle-to-vehicle distance sensor 106 and stores the signal as a relative distance to the front obstacle in the travel direction of own vehicle. In a method of storing the relative distances, the number of front obstacles is stored as a variable Zn, and each of a plurality of obstacles is numbered with n (n=0, 1, 2, ..., Zn−1). The relative position of each of the plurality of the front obstacles is stored as coordinate data (Zx(n), Zy(n)). Zx(n) represents a distance in the travel direction of own vehicle (in the longitudinal axis of own vehicle) and zy(n) represents a distance in the lateral direction (perpendicular to the longitudinal axis of own vehicle). In step 304, the controller 105 stores an acceleration and deceleration ZAs, which is a derivative of the speed ZVs of own vehicle. Optionally, the acceleration and deceleration ZAs may be determined by averaging (or filtering) the present acceleration and deceleration, the preceding acceleration and deceleration, the acceleration and deceleration prior to the preceding acceleration and deceleration, and even older accelerations and decelerations. In step 305, the controller 105 receives a signal from the yaw-rate sensor 119, and stores the signal as a yaw rate Zr. Upon completion of steps 301 through 305, the controller 105 goes to step 203 shown in FIG. 2.

The processing steps in steps 203 through 207 calculate the traveling direction target accelerations and decelerations and safe accelerations and decelerations for all detected front obstacles. In step 203, the variable n assigned to each front obstacle is defaulted to zero. If the relationship n<Zn is found to hold in step 204, the front obstacle having assignment number zero is subjected to a traveling direction target acceleration and deceleration calculation process (to be described later) in step 205 and a safe acceleration and deceleration calculation process (to be described later) in step 206. In step 207, the variable n is incremented to perform processing steps in step 205 and step 206 on a front obstacle having a next assignment number, and the controller 105 returns to step 204. In step 204, if the relationship n<Zn is not found to hold, i.e., if steps 205 and 206 are performed on all front obstacles, the controller 105 skips to step 208.

Figure 4:
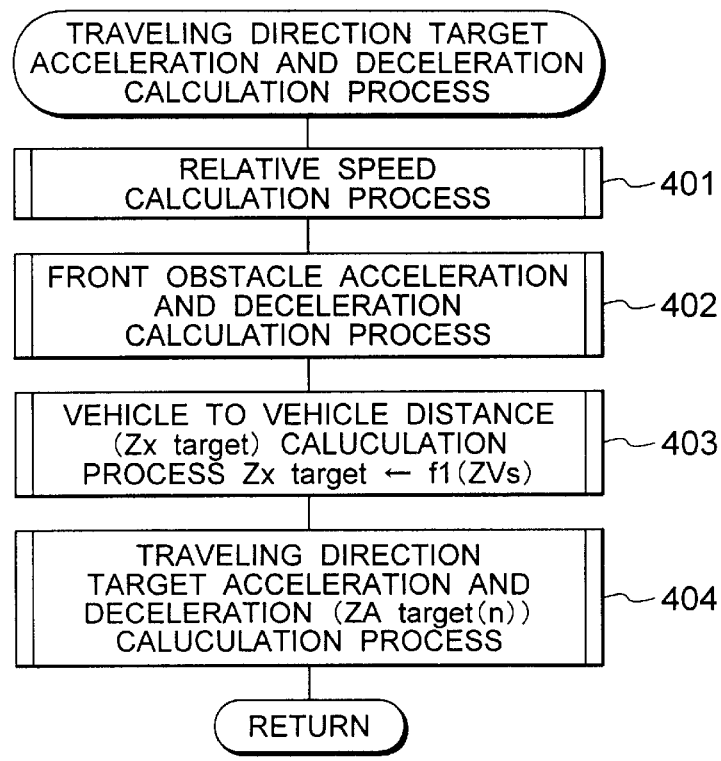
FIG. 4 is a flow diagram of a traveling direction target acceleration and deceleration calculation process of the first embodiment of the present invention.

Discussed next is the traveling direction target acceleration and deceleration calculation process in step 205 shown in FIG. 2. FIG. 4 is a flow diagram of a program for the traveling direction target acceleration and deceleration calculation process. Zxtarget, ZdL, and ZAtarget(n), to be discussed later, are stored in the storage unit 110, and are variables readable and rewritable, and $Xk_1$ and $Xk_2$ are data beforehand stored in the storage unit 110 and are readable but not rewritable.

The traveling direction acceleration and deceleration calculation process shown in FIG. 4 is a routine for calculating the traveling direction acceleration and deceleration at which own vehicle runs with a predetermined distance maintained to the front obstacle. The traveling direction acceleration and deceleration at which own vehicle runs with the predetermined distance maintained to the front obstacle is analyzed as below. Now, own vehicle follows the front obstacle with a distance Zx(n) [m] spaced apart therefrom. The position of the front obstacle Sp, t seconds later, is expressed by equation (1) relative the current position of own vehicle.

$$Sp = ZVp \cdot t + ZAp \cdot t^2/2 + Zx(n) [m] (t \geq 0) \quad (1)$$

where ZVp is the speed of the front obstacle [m/s] and ZAp is the acceleration or deceleration of the front obstacle [m/s$^2$].

The position of own vehicle Ss, t seconds later, is expressed by equation (2).

$$Ss = ZVs \cdot t + ZAs \cdot t^2/2 [m] (t \geq 0) \quad (2)$$

where ZVs is the speed of own vehicle [m/s], and ZAs is the acceleration or deceleration of own vehicle [m/s$^2$].

It is assumed that ZVp, ZAp, ZVs, and ZAp remain constant during t seconds.

Equation (3) must hold for own vehicle to follow the front obstacle with a target distance Zxtarget maintained therebetween.

$$Sp-Ss=Zxtarget \quad (3)$$

Equation (4) results if equations (1) and (2) are substituted in equation (3).

$$(ZAp-ZAs)/2 \cdot t^2+(ZVp-ZVs) \cdot t+(Zx(n)-Zxtarget)=0(ZAp-ZAs)/2 \cdot t^2+ZVr \cdot t+ZdL=0 \quad (4)$$

where ZVr is a relative speed [m/s] (=ZVp−ZVs), and ZdL is a distance difference [m] (=Zx(n)−Zxtarget).

If equation (4) is expressed to determine ZAs, $$ZAs=2/t^2 \cdot ZdL+2/t \cdot ZVr+ZAp=Xk_1 \cdot ZdL+Xk_2 \cdot ZVr+ZAp(=ZAtarget(n)) \quad (5)$$

where $Xk_1=2/t^2$, and $Xk_2=2/t$, and $t \geq 0$, $Xk_1>0$, and $Xk_2>0$

ZAs in equation (5) represents a traveling direction target acceleration and deceleration AZtarget(n) of own vehicle for own vehicle to run after the front obstacle with a distance Zxtarget maintained therebetween. Given t, both $Xk_1$ and $Xk_2$ are uniquely determined.

The flow of the above-referenced traveling direction target acceleration and deceleration calculation process of the first embodiment is now discussed, referring to the flow diagram shown in FIG. 4. In step 401, a derivative of the distance Zx(n), i.e., the difference between the present value and the preceding value of the distance, is divided by the period (20 ms) of the main routine, and the quotient is stored as a relative speed ZVr to the front obstacle. Optionally, the relative speed ZVr is subjected to filtering. In step 402, the sum of the relative speed ZVr and the speed of own vehicle ZVs (i.e., the speed of the front obstacle) is once differentiated, and the resulting derivative is stored as the acceleration and deceleration ZAp. Optionally, the acceleration and deceleration ZAp of the front obstacle is also subjected to filtering.

Figure 5:
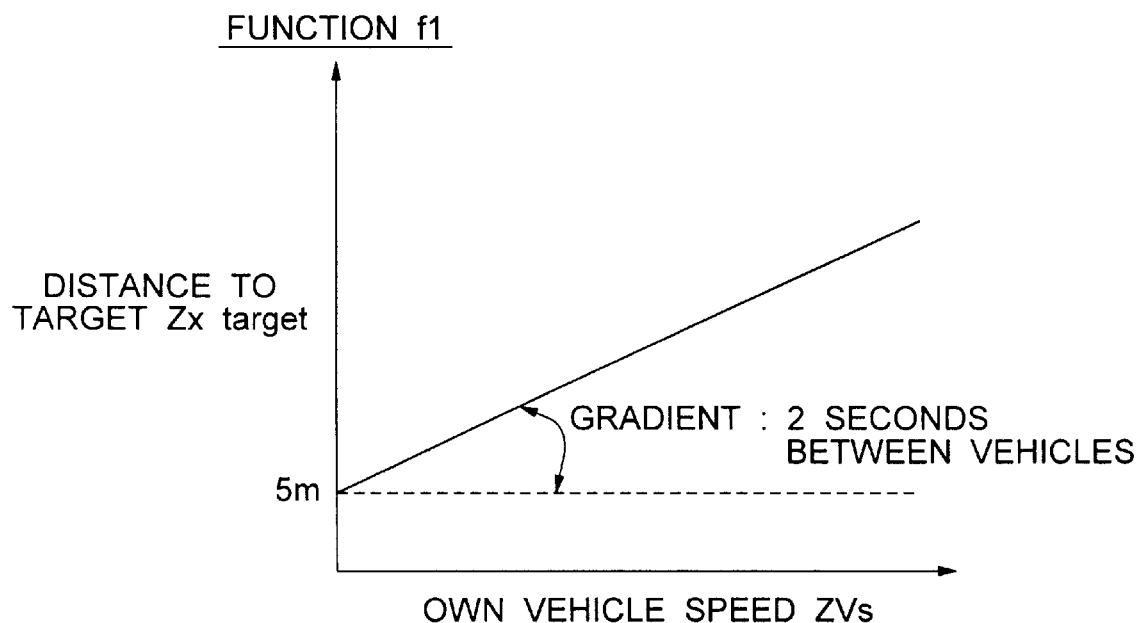
FIG. 5 shows target distance characteristics, represented by a function f1, in accordance with the first embodiment of the present invention.

In step 403, the target distance Zxtarget is calculated based on the speed ZVs of own vehicle according to a function f1 as shown in FIG. 5. According to the function f, the target distance Zxtarget is uniquely determined by the speed ZVs of own vehicle, and the gradient of the line corresponds to a vehicle-to-vehicle time interval. The vehicle-to-vehicle time interval is 2 seconds in the first embodiment. In step 404, the traveling direction target acceleration and deceleration ZAtarget(n) expressed by equation (5) is calculated with t=0.5 s, $Xk_1=8$, and $Xk_2=4$, for instance.

A time duration of 0.5 s is a sum of time an average driver requires to sense, recognize and then determine the situation ahead of own vehicle. According to experiments, the car is comfortable and agreeable to drive by setting t in the vicinity of 0.5 s in the follow-up cruise control apparatus. The controller 105 goes to step 206 shown, subsequent to the above steps 401 through 404 shown in FIG. 2.

Figure 6:
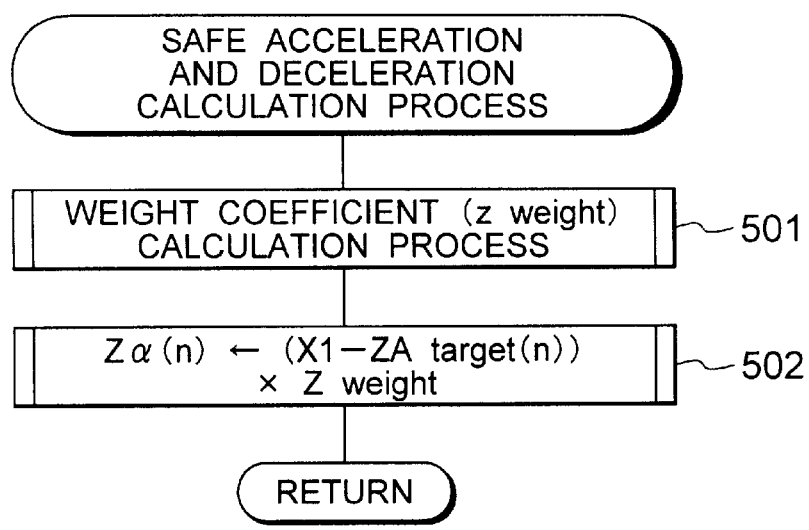
FIG. 6 is a flow diagram showing a safe acceleration and deceleration calculation process in accordance with the first embodiment of the present invention.
Figure 7:
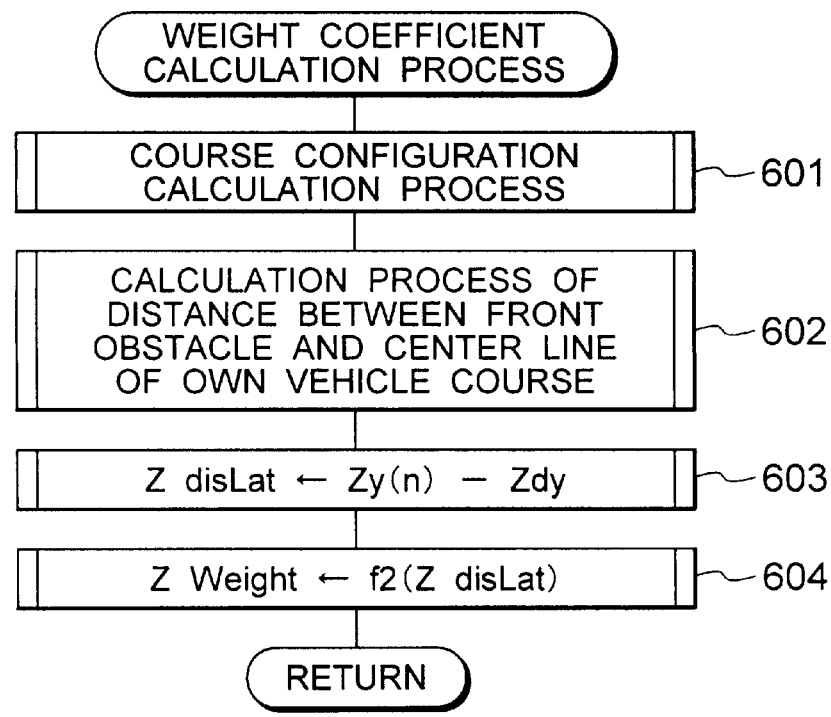
FIG. 7 is a flow diagram showing a weight coefficient calculation process in accordance with the first embodiment of the present invention.

Discussed next is the safe acceleration and deceleration calculation process in step 206 shown in FIG. 2. FIG. 6 is a flow diagram of a program of the safe acceleration and deceleration calculation process. In step 501, a weight coefficient is calculated to correct the traveling direction target acceleration and deceleration AZtarget(n). The weight coefficient calculation process is now discussed. FIG. 7 is a flow diagram of a program of the weight coefficient calculation process. In step 601, the configuration of the course of own vehicle is estimated based on the yaw rate Zr of own vehicle. Specifically, a radius of course ZR of the center line of the course of own vehicle is estimated (calculated). The radius of course ZR is determined according to equation (6). The radius of course ZR determined according to equation (6) is limited to be less than infinity so that no overflow is permitted with the yaw rate Zr=0, and when limited, the course is considered to be a straight line.

$$ZR=ZVs/Zr[m](Zr \neq 0) \quad (6)$$

where ZVs is the speed of own vehicle [m], and Zr is the yaw rate [rad/s].

Figure 9:
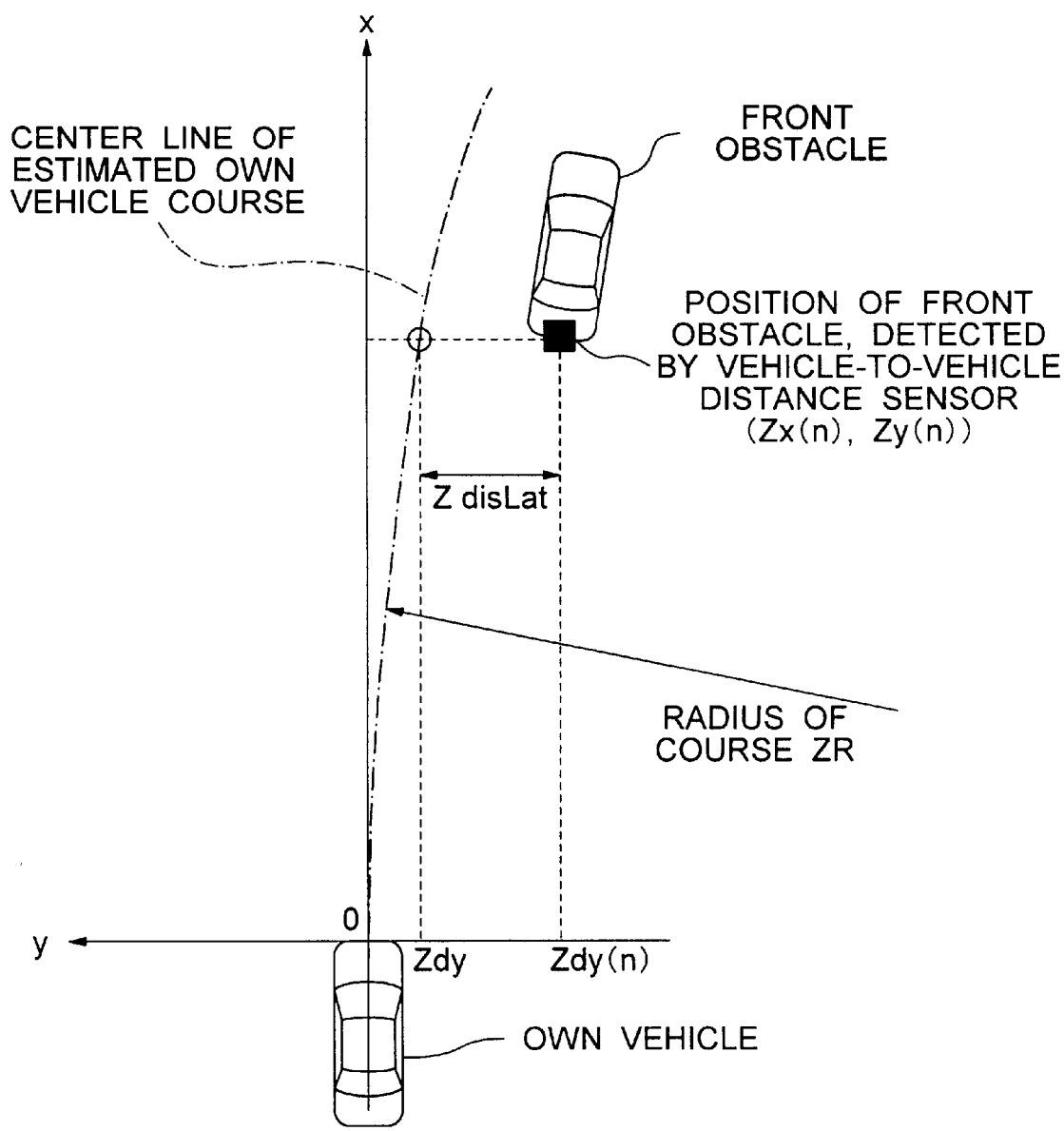
FIG. 9 is a diagram explaining the weight coefficient in accordance with the first embodiment of the present invention.

In step 602 and 603, a distance between the front obstacle and the center line of the own vehicle course (see FIG. 9) is calculated according to equations (7) and (8) and stored as ZdisLat.

$$Zdy=Zx(n)^2/(2 \times ZR)[m] \quad (7)$$

$$ZdisLat=Zy(n)-Zdy[m] \quad (8)$$

where Zdy is the position of the center line of the own vehicle course at distance Zx(n) to the front obstacle, Zx(n) is the distance to the front obstacle [m], Zy(n) is the lateral position of the front obstacle [m], and ZR is the radius of the road.

Figure 8:
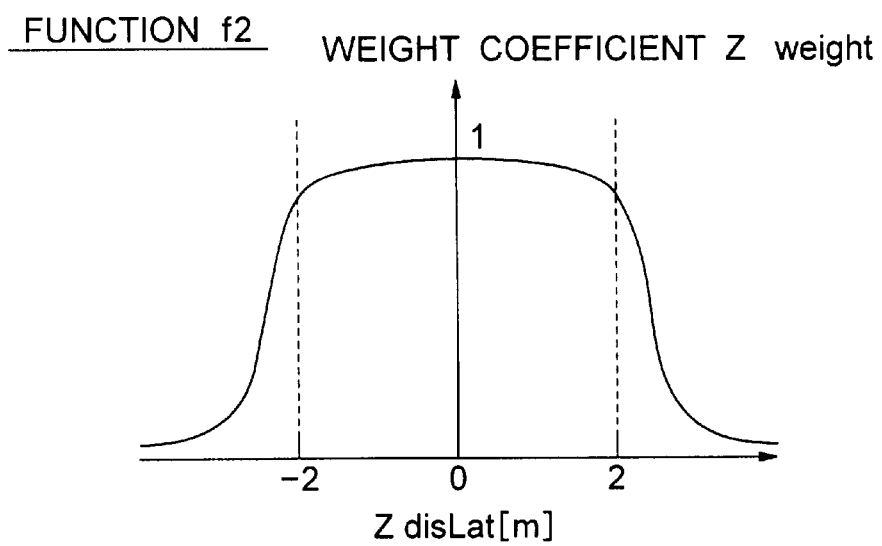
FIG. 8 shows weight coefficient characteristics, represented by a function f2, in accordance with the first embodiment of the present invention.

In step 604, the weight coefficient Zweight is calculated based on the distance ZdisLat between the front obstacle and the center line of the own vehicle course according to a function f2 shown in FIG. 8. Zweight is uniquely determined by ZdisLat according to the function f2, and varies in response to the value of ZdisLat as shown in FIG. 8. When a front obstacle is present in the own vehicle course, for instance, the value 1 is entered as Zweight. As the front obstacle goes far away from the center line of the own vehicle course, as a result of moving into an adjacent lane, for instance, the value close to zero is entered as Zweight. The controller 105 goes to step 502 shown in FIG. 6, subsequent to the above steps 601 through 604.

In step 502, a difference, which is obtained by subtracting the traveling direction target acceleration and deceleration ZAtarget(n) from a predetermined value (−10 m/s², for instance), is multiplied by the weight coefficient derived through the weight coefficient process in step 502, and the resulting product is then stored as a safe acceleration and deceleration Zα(n). The controller 105 goes to step 207 shown in FIG. 2, subsequent steps 501 through 502.

Figure 10:
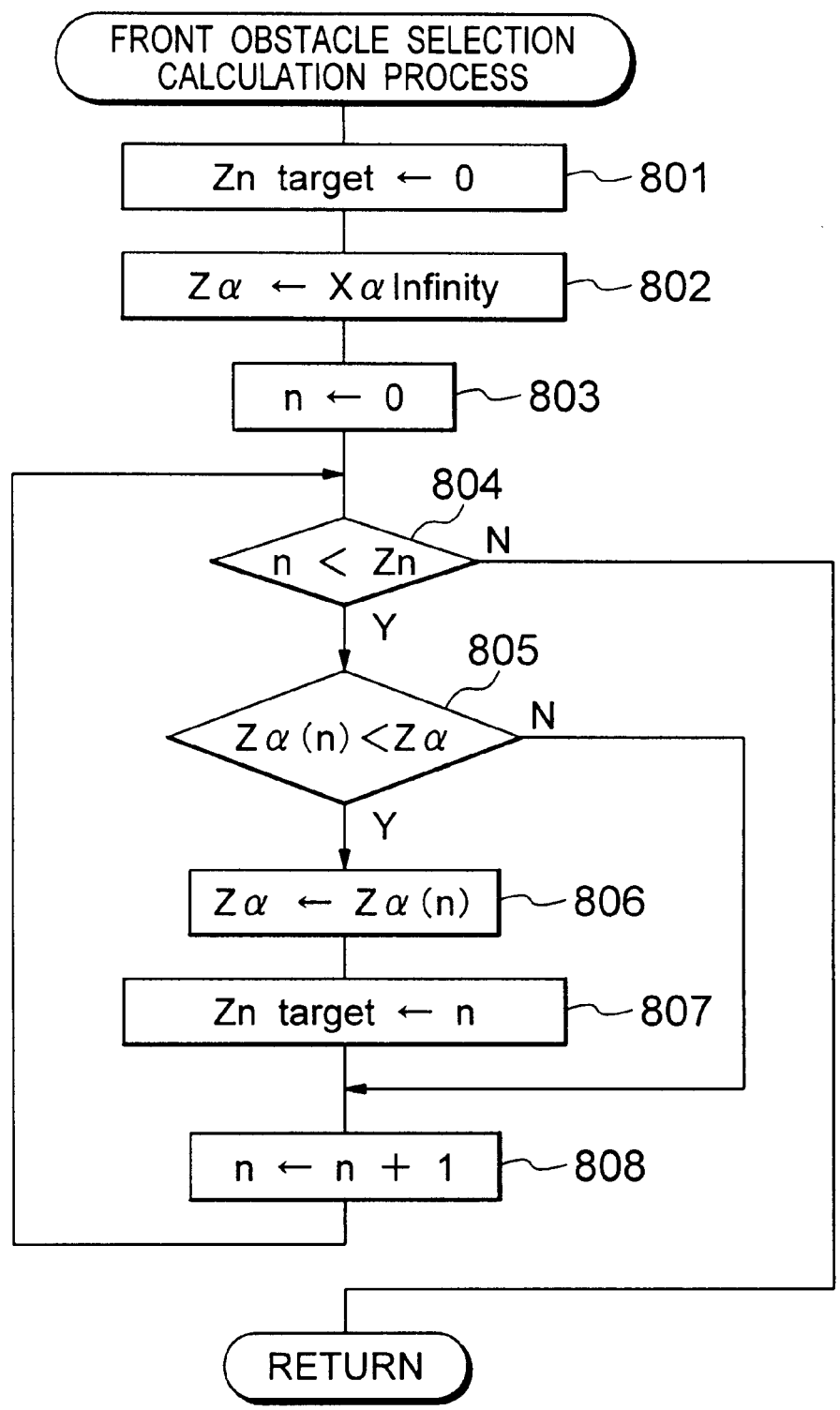
FIG. 10 is a flow diagram showing a front obstacle selection process in accordance with the first embodiment of the present invention.

The front obstacle selection process in step 208 shown in FIG. 2 is now discussed. FIG. 10 is a flow diagram of a program of the front obstacle selection process. The front obstacle selection process selects a front obstacle having a smallest safe acceleration and deceleration Zα(n), i.e., a front obstacle presenting the highest degree of risk of collision, from among the front obstacles detected by the vehicle-to-vehicle sensor. In step 801, the controller 105 initializes, to zero, a variable Zntarget which stores an assignment number for a front obstacle which presents the highest degree of risk of collision. In step 802, the controller 105 initializes, to Xαinfinity (a value representing infinity), a variable Zα for storing the safe acceleration and deceleration of the front obstacle presenting the highest degree of risk of collision.

In step 803, the variable n is initialized to zero to switch the assignment number of the front obstacle. The controller 105 goes to step 805 if the relationship n<Zn (Zn is the number of obstacles detected by the vehicle-to-vehicle distance sensor) is found to hold in step 804. In step 805, the controller 105 determines whether the acceleration and deceleration $Z\alpha(0)$ of a front obstacle having an assignment number zero is smaller than $Z\alpha$ ($X\alpha$infinity), i.e., $Z\alpha(0) < Z\alpha$. When it is determined that the relationship $Z\alpha(0) < Z\alpha$ is found to hold, the controller 105 goes to steps 806 and 807. The safe acceleration and deceleration $Z\alpha(0)$ of the front obstacle having the assignment number zero and the assignment number zero are respectively stored in $Z\alpha$ and Zntarget. The controller 105 goes to step 808.

When it is not found in step 805 that the relationship $Z\alpha(0) < Z\alpha$ holds, the controller 105 goes to step 808. In step 808, the variable n is incremented to perform processing steps 804 through 807 on a front obstacle having a next assignment number. If the relationship n<Zn is not found to hold in step 804, in other words, processing steps in steps 805 through 807 are completed on all front obstacles, the controller 105 goes to step 209 in FIG. 2.

Figure 11:
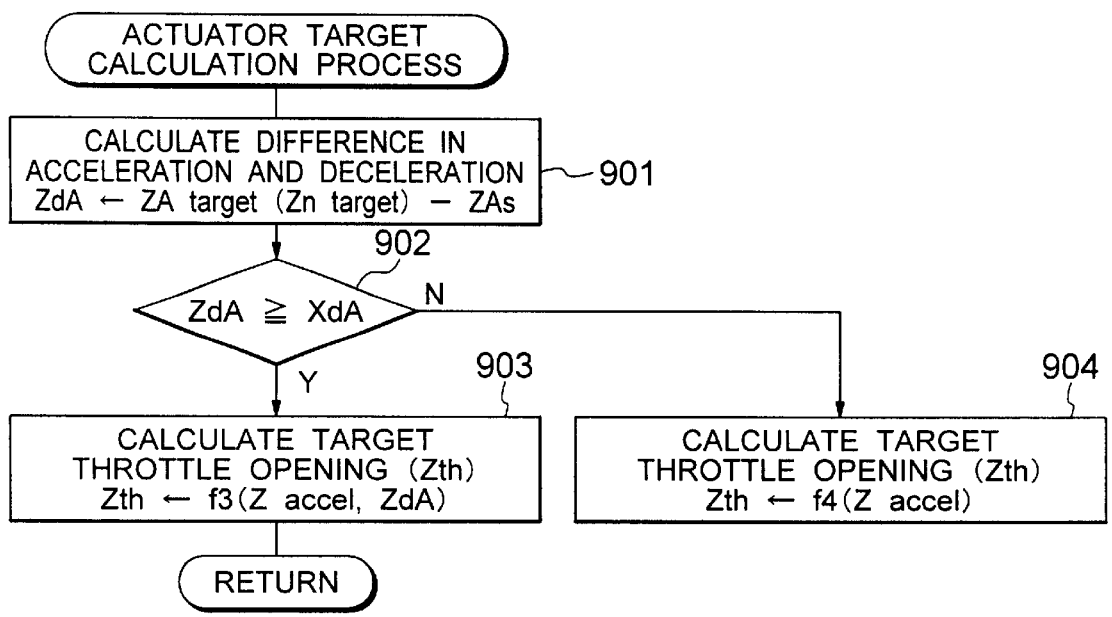
FIG. 11 is a flow diagram showing an actuator target calculation process in accordance with the first embodiment of the present invention.

An actuator target calculation process in step 209 shown in FIG. 2 is now discussed. FIG. 11 is a flow diagram of a program of the actuator target calculation process. In step 901, the controller 105 calculates the difference between the acceleration and deceleration ZAs of own vehicle and the traveling direction target acceleration and deceleration ZAtarget(n) based on the front obstacle Zntarget selected through the front obstacle selection process, and the resulting difference is stored as the variable ZdA. In step 902, the controller 105 determines whether the acceleration and deceleration difference ZdA obtained in step 901 is greater than a predetermined XdA, i.e., $ZdA \geq XdA$.

Figure 12:
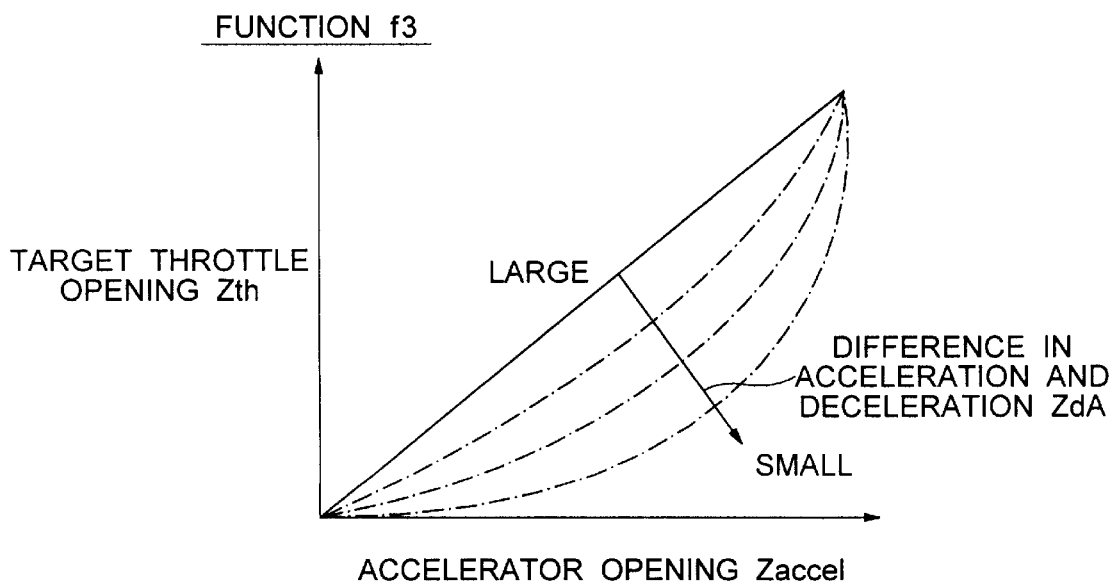
FIG. 12 shows acceleration versus throttle opening characteristics, represented by a function f3, in accordance with the first embodiment of the present invention.

If the relationship $ZdA \geq XdA$ is found to hold, the controller 105 goes to step 903. The controller 105 calculates a target throttle opening Zth based on the accelerator opening Zaccel and the safe acceleration and deceleration $Z\alpha$ according to a function f3 as shown in FIG. 12. According to the function f3, the target throttle opening Zth is uniquely determined by the accelerator opening Zaccel, and varies in response to the magnitude of the acceleration and deceleration ZdA as shown in FIG. 12. For instance, the characteristic represented by a solid line is obtained when own vehicle does not collide with the front obstacle.

Figure 13:
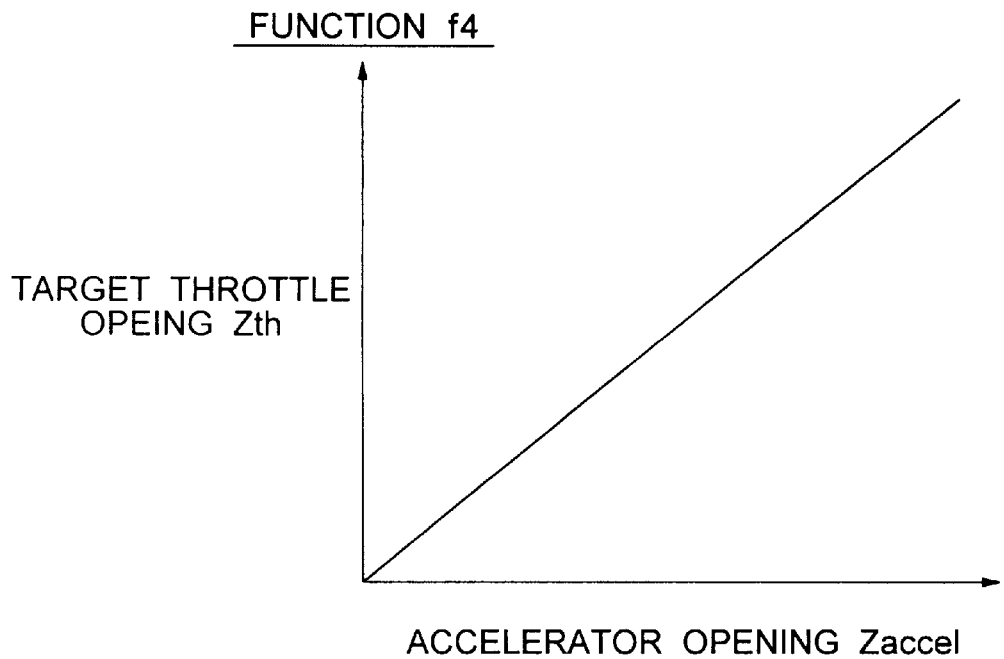
FIG. 13 shows accelerator opening versus throttle opening characteristics, represented by a function f4, in accordance with the first embodiment of the present invention.

If the relationship $ZdA \geq XdA$ is not found to hold, the controller 105 goes to step 904, and calculates the target throttle opening Zth based on the accelerator opening Zaccel according to a function f4 as shown in FIG. 13. According to the function f4, the target throttle opening Zth is uniquely determined by the accelerator opening Zaccel. The throttle opening in response to an acceleration pedal operation by the driver is thus set. The controller 105 goes to step 210 shown in FIG. 2, subsequent to the above steps 901 through 904.

Figure 14:
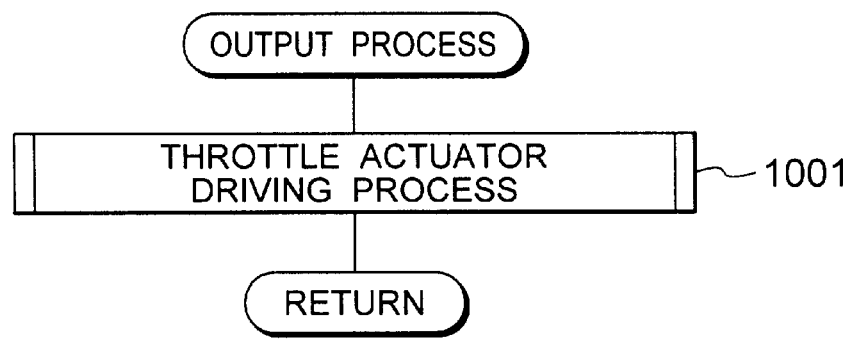
FIG. 14 is a flow diagram showing an output process in accordance with the first embodiment of the present invention.

An output process instep 210 shown in FIG. 2 is now discussed. FIG. 14 is a flow diagram of a program of the output process. In step 1001, the controller 105 adjusts the opening of the throttle valve 103 by driving the throttle actuator 104 in response to the target throttle opening Zth calculated in the actuator target calculation process. Upon completion of the step 1001, the controller 105 goes to step 202 shown in FIG. 2 to repeat the above processes at the predetermined intervals.

The actuator target calculation process in step 209 and the output process in step 210 constitute a major portion of vehicle control process.

The follow-up cruise control apparatus of the first embodiment of the present invention calculates the own vehicle traveling direction acceleration and deceleration ZAtarget(n) to maintain a predetermined distance to each of the front obstacles present ahead of own vehicle, and multiplies the traveling direction acceleration and deceleration ZAtarget(n) by the weight coefficient determined by the distance ZdisLat between the front obstacle and the center line of the own vehicle course, and treats the product as the safe acceleration and deceleration $Z\alpha(n)$. The follow-up cruise control apparatus selects the front obstacle having the safe acceleration and deceleration $Z\alpha(n)$ indicating the highest degree of risk of collision, from among the front obstacles. Based on the acceleration and deceleration difference between the safe acceleration and deceleration of the front obstacle and the own vehicle acceleration and deceleration ZAs, the follow-up cruise control apparatus controls the driving power of own vehicle, which is normally uniquely determined by the acceleration operation by the driver.

Figure 32A:
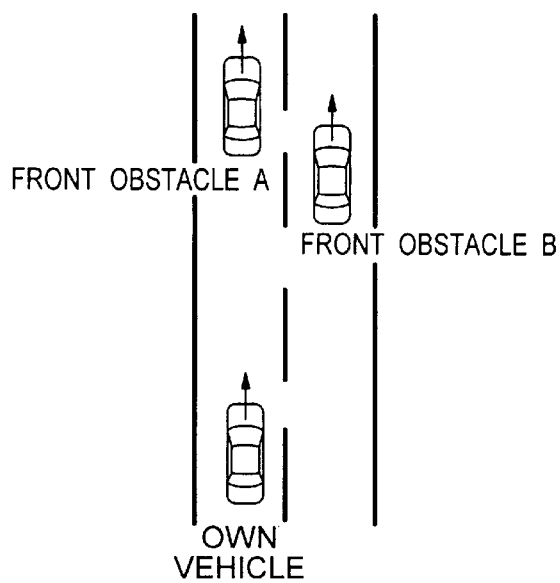
FIG. 32A through FIG. 32D show the relationship between own vehicle and a front obstacle in the present invention and a conventional art.

In this arrangement, the apparatus selects, as a vehicle to be followed-up, the front obstacle A because the front obstacle B has a substantially smaller weight coefficient than the front obstacle A when own vehicle and the front obstacles A and B are running in different lanes under the condition 1 as shown in FIG. 32A.

Figure 32B:
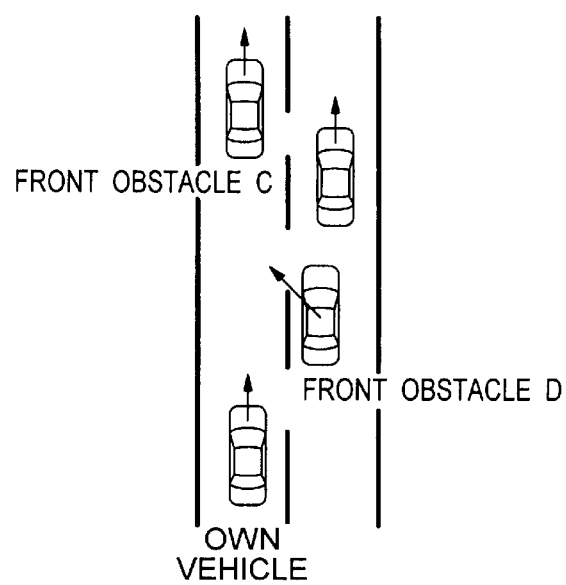

Referring to FIG. 32B, own vehicle and the obstacle C run in the same lane with the obstacle C handled as a vehicle to be followed-up by own vehicle. Under the condition 2, the obstacle D now attempts to somewhat forcibly enter between own vehicle and the obstacle C. As own vehicle approaches the front obstacle D, the weight coefficient of the front obstacle D becomes close to that of the front obstacle C. The apparatus selects, as the vehicle to be followed-up, the front obstacle C or D, whichever presents a higher degree of risk of collision. When the obstacle D has the acceleration and deceleration substantially larger in a negative direction than that of the obstacle C, the traveling direction target acceleration and deceleration ztarget (n) of the front obstacle D becomes a substantially large negative value. As a result, the safe acceleration and deceleration $Z\alpha(n)$ of the front obstacle D indicates a high degree of risk of collision, compared with that of the front obstacle C, even if the lateral distance between own vehicle and the front obstacle D is large. At an early stage subsequent to the start of the entering attempt by the obstacle D, the apparatus switches the vehicle to be followed-up, from the front obstacle C to the front obstacle D.

Figure 32C:
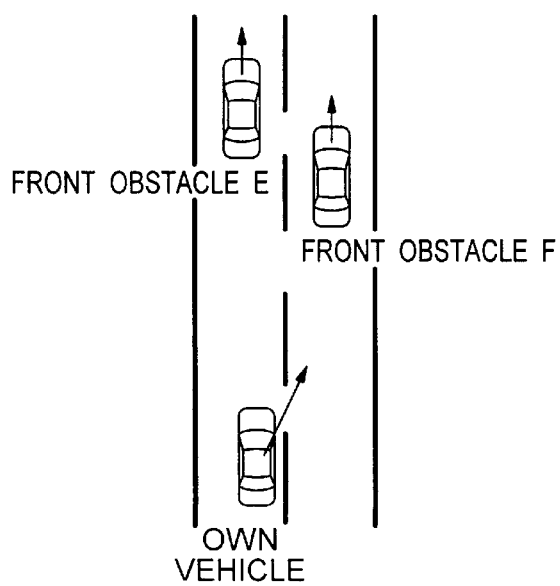

Referring to FIG. 32C, own vehicle and the front obstacle E are now running in the same lane. The obstacle E is the vehicle to be followed-up by own vehicle. Under the condition 3, own vehicle now attempts to change to the lane in which an obstacle F is running. As own vehicle approaches the lane of the front obstacle F, the weight coefficient of the front obstacle F becomes close to that of the front obstacle E. The apparatus selects, as the vehicle to be followed-up, the front obstacle E or F, whichever presents a higher degree of risk of collision. When the obstacle F has the acceleration and deceleration substantially larger in a negative direction than that of the obstacle E, the traveling direction target acceleration and deceleration Ztarget(n) of the front obstacle F becomes a substantially large negative value. As a result, the safe acceleration and deceleration $Z\alpha(n)$ of the front obstacle F indicates a high degree of risk of collision, compared with that of the front obstacle E, even if the lateral distance between own vehicle and the front obstacle F is large. At an early stage subsequent to the start of the lane change attempt by own vehicle, the apparatus switches the vehicle to be followed-up, from the front obstacle E to the front obstacle F.

Figure 32D:
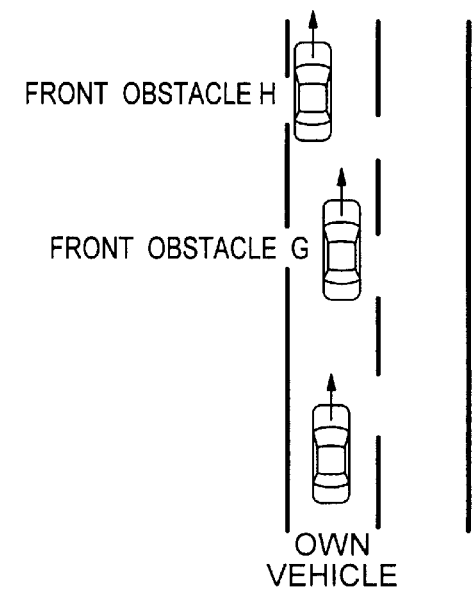

Referring to FIG. 32D, own vehicle, and front obstacles H and G are running in the same lane and own vehicle follows-up the front obstacle G under a condition 4. Own vehicle is now equipped with a vehicle-to-vehicle distance sensor capable of detecting not only the front obstacle G but also the front obstacle H. When the front obstacle H applies the brake, the front obstacle H gives a safe acceleration and deceleration having a higher degree of risk of collision than the front obstacle G. Own vehicle thus switches the vehicle to be followed-up, from the front vehicle G to the front vehicle H, thereby performing deceleration control, prior to when the front obstacle H starts deceleration. When own vehicle safely follow the vehicle being followed-up (i.e., $Z\alpha<X\alpha$), the controller 105 sets the throttle opening in accordance with the travel of the acceleration pedal 112 by the driver, according to the function f4 representing the throttle opening characteristics. The driving power is thus generated in response to the acceleration operation by the driver. When own vehicle fails to safely run to the vehicle being tacked (i.e., $Z\alpha \geq X\alpha$), the throttle opening is controlled in response to the safe acceleration and deceleration $Z\alpha$ according the function f3 representing the throttle opening characteristics. As a result, the driving power of own vehicle is controlled, the follow-up cruise control apparatus prevents own vehicle from dangerously closely approaching or colliding with the front obstacle, thereby assuring a safe driving of the vehicle.

In accordance with the first embodiment, own vehicle selects, as a vehicle to be followed-up, a front vehicle presenting the highest degree of risk of collision to own vehicle, or selects a front vehicle which the driver desire to follow-up. The driver finds himself or herself in concert with the behavior of own vehicle under the control of the follow-up cruise control apparatus, without feeling ill at ease with the risk of collision. The arrangement, requiring no means for detecting the change of lane by own vehicle and the front obstacle, helps simplify the corresponding portion of the apparatus and the processing steps therefor.

The arrangement of the follow-up cruise control apparatus of the first embodiment controls the driving power of the vehicle by adjusting the opening of the throttle valve 103 to adjust the air intake amount to the engine 101. The present invention is not limited to this. A diversity of methods for controlling the driving power may be employed. For instance, when the power source for generating the driving power is an electric motor, the driving power is controlled by adjusting a current flowing through the motor.

The target distance Zxtarget in the first embodiment is based on the speed of own vehicle ZVs only. Alternatively, the target distance Zxtarget may be based on not only the own vehicle speed ZVs but also the relative speed ZVr to the front obstacle and the acceleration and deceleration ZAp of the front obstacle.

In the traveling direction target acceleration and deceleration process in the first embodiment, $Xk_1$ and $Xk_2$ are beforehand stored as data with a predetermined value set to t. Alternatively, the value of t may be determined by the relationship to the front obstacle, and $Xk_1$ and $Xk_2$ may be successively calculated. For instance, the value t may be a time duration before a collision with the front obstacle as already discussed in connection with the first embodiment. Specifically, the value t causes equation (3)=0 to hold.

The traveling direction acceleration and deceleration calculation process in the first embodiment calculates the traveling direction target acceleration and deceleration which causes own vehicle to follow the front obstacle with the target distance Zxtarget maintained after t=0.5 s, from the current distance Zx(n). The present invention is not limited to this method, and other traveling direction acceleration and deceleration calculation processes are possible.

The estimation process of the course configuration in the first embodiment calculates the radius of course ZR of own vehicle based on the own vehicle yaw rate Zr. The radius of course ZR may be determined based on the configuration of a lane separator that is obtained by processing a camera image from a CCD camera mounted on the front portion of own vehicle. Alternatively, the present invention may employ a vehicle-to-vehicle distance sensor, which measures a distance to a front obstacle by counting time a light ray takes to return to own vehicle. The vehicle-to-vehicle distance sensor detects a plurality of reflectors (delineators) arranged along the lane, and the configuration of the lane is estimated referring to the layout of the reflectors.

In step 901 of the first embodiment, the controller 105 calculates the difference between the acceleration and deceleration ZAs of own vehicle and the traveling direction target acceleration and deceleration ZAtarget(n) based on the front obstacle Zntarget selected through the front obstacle selection process, and the resulting difference is stored as the variable ZdA. Alternatively, the difference between the own vehicle acceleration and deceleration ZAs and the safe acceleration and deceleration $Z\alpha(n)$ of the front obstacle Zntarget selected through the front obstacle selection process may be calculated and stored as the variable ZdA.

Second Embodiment

Figure 15:
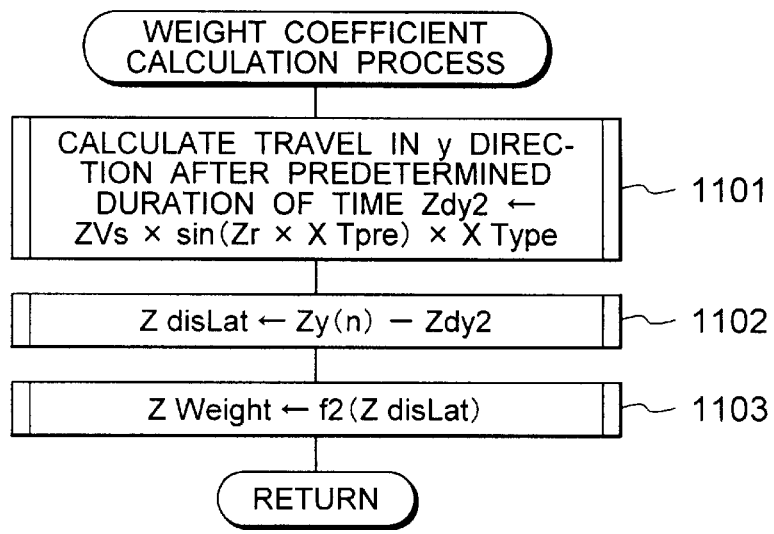
FIG. 15 is a flow diagram showing a weight coefficient calculation process in accordance with a second embodiment of the present invention.
Figure 16:
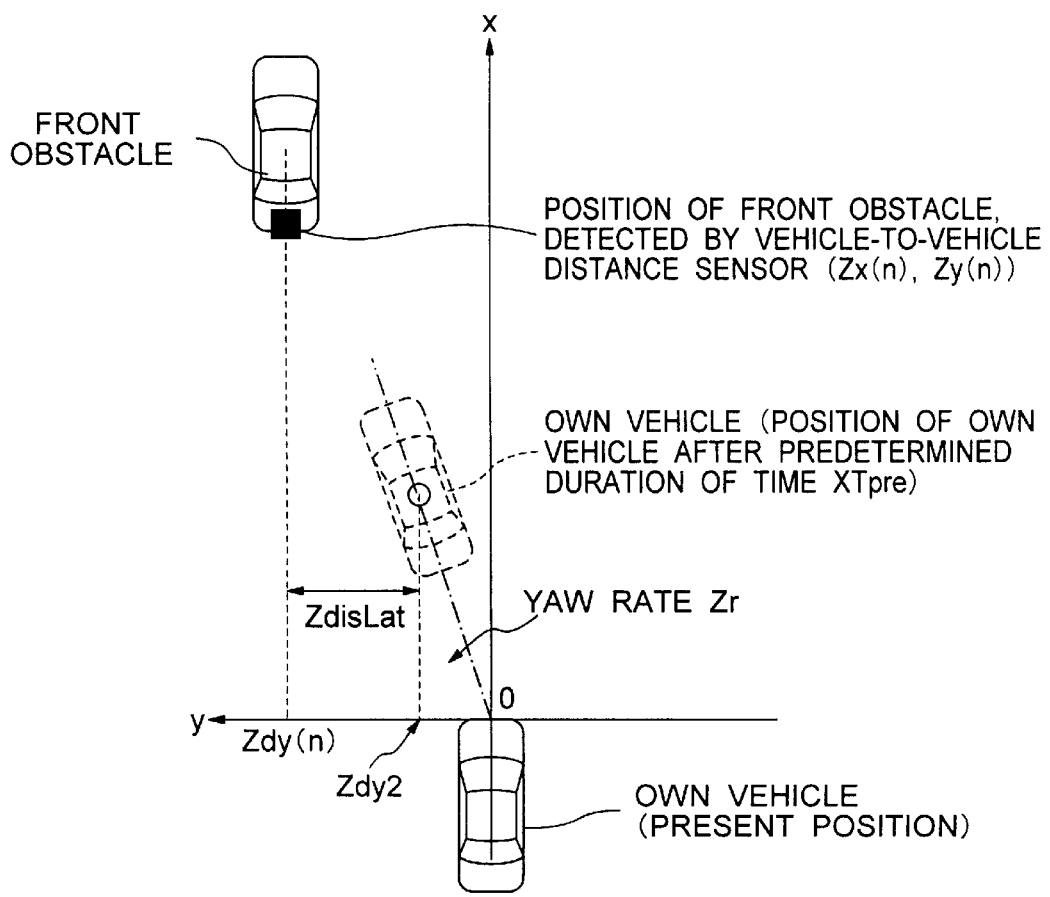
FIG. 16 is a diagram explaining the weight coefficient in accordance with the second embodiment of the present invention.

The construction and program of a follow-up cruise control apparatus of a second embodiment of the present invention are based on those of the first embodiment. The second embodiment includes a modified weight coefficient calculation process as shown in FIG. 15. Zdy2, to be described later, is a variable which can be read from and rewritten onto the storage unit 110. XTpre is data which is beforehand stored in the storage unit 110, and which can be read only and cannot be rewritten. In step 1101, the controller 105 calculates a predicted distance of travel Zdy2 of own vehicle in a y direction after a predetermined duration of time with the yaw rate Zr and speed ZVs of own vehicle according to equation (9) (see FIG. 16).

$$Zdy2=ZVs\times sin(Zr\times XTpre)\times XTpre[m] \qquad (9)$$

where ZVs is the own vehicle speed [m], Zr is the yaw rate [rad/s], and XTpre is a predetermined duration of time [s].

In step 1102, the controller 105 calculates the distance between the front obstacle and own vehicle after the predetermined duration of time according to equation (10), and stores the distance as ZdisLat.

$$ZdisLat=Zy(n)-Zdy2[m] \qquad (10)$$

where Zy(n) is the lateral position of the front obstacle [m].

In step 1103, the controller 105 calculates the weight coefficient Zweight based on the distance ZdisLat between the front obstacle and own vehicle after the predetermined duration of time XTpre according to the function f2 as shown in FIG. 8. Zweight is uniquely determined by ZdisLat according to the function f2. When a front obstacle is near own vehicle after the predetermined duration of time, for instance, the value 1 is entered as Zweight. As own vehicle is far away from the front obstacle, the value close to zero is entered as Zweight. The controller 105 goes to step 502 shown in FIG. 5, subsequent to the above steps 1101 through 1103.

The second embodiment operates in the same way as the first embodiment and provides the same advantages as those of the first embodiment.

The weight coefficient in the second embodiment is determined by calculating the predicted distance between own vehicle and the front obstacle after the predetermined duration of time XTpre. The predetermined duration XTpre may be time proportional to the own vehicle speed, time proportional to the relative speed between own vehicle and the front obstacle, or time before a collision with the front obstacle.

Third Embodiment

Figure 17:
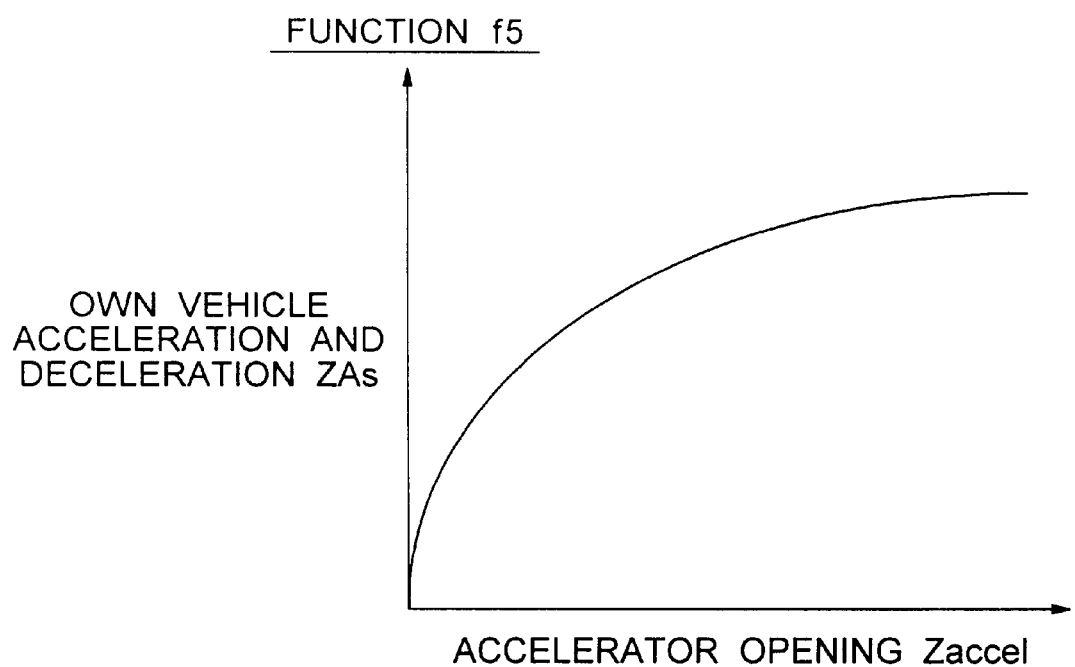
FIG. 17 shows accelerator opening versus own vehicle acceleration and deceleration characteristics, represented by a function f5, in accordance with a third embodiment of the present invention.

The construction and program of the follow-up cruise control apparatus of a third embodiment are based on those of the first embodiment. However, the third embodiment includes a modification in the own vehicle acceleration and deceleration calculation process. In the own vehicle acceleration and deceleration calculation process described above, a derivative of the own vehicle speed ZVs is stored as the own vehicle acceleration and deceleration ZAs. In the own vehicle acceleration and deceleration calculation process of the third embodiment, however, the own vehicle acceleration and deceleration ZAs is determined by the accelerator opening Zaccel according to a function f5 as shown in FIG. 17. According to the function f5, as the accelerator opening Zaccel becomes larger, the own vehicle acceleration and deceleration ZAs become are larger.

The follow-up cruise control apparatus of the third embodiment calculates the own vehicle acceleration and deceleration As in relation to the accelerator opening Zaccel. In this arrangement, the acceleration-state of own vehicle is detected prior to a change in acceleration and deceleration resulting from the acceleration action by the driver, and a change appears in the safe acceleration and deceleration indicating the degree of risk of collision with the front obstacle prior to a timing of the own vehicle acceleration and deceleration ZAs based on the own vehicle speed ZVs. As a result, the switching timing of the vehicle to be followed-up becomes fast, relieving the driver from having the anxiety of a collision.

In the third embodiment, the own vehicle acceleration and deceleration ZAs are calculated based on the accelerator opening Zaccel detected through the accelerator opening sensor. Alternatively, an accelerator switch 113a for detecting whether an acceleration pedal is pressed by a predetermined angle is arranged instead of the accelerator opening sensor 113 (see FIG. 1) (each of the accelerator opening sensor 113 and the accelerator switch 113a is referred as an acceleration-state detection element). The own vehicle acceleration and deceleration ZAs is calculated in response to the state of the acceleration switch 113a.

Fourth Embodiment

The construction of the follow-up cruise control apparatus of a fourth embodiment is based on that of the first embodiment described with reference to FIG. 1. The fourth embodiment additionally includes an engine RPM sensor 117 for detecting the RPM of the engine 101, and a shift position sensor 116 for detecting the position of a shift lever 115 of the automatic transmission 114. The signals from the two sensors are input to the controller 105.

Figure 18:
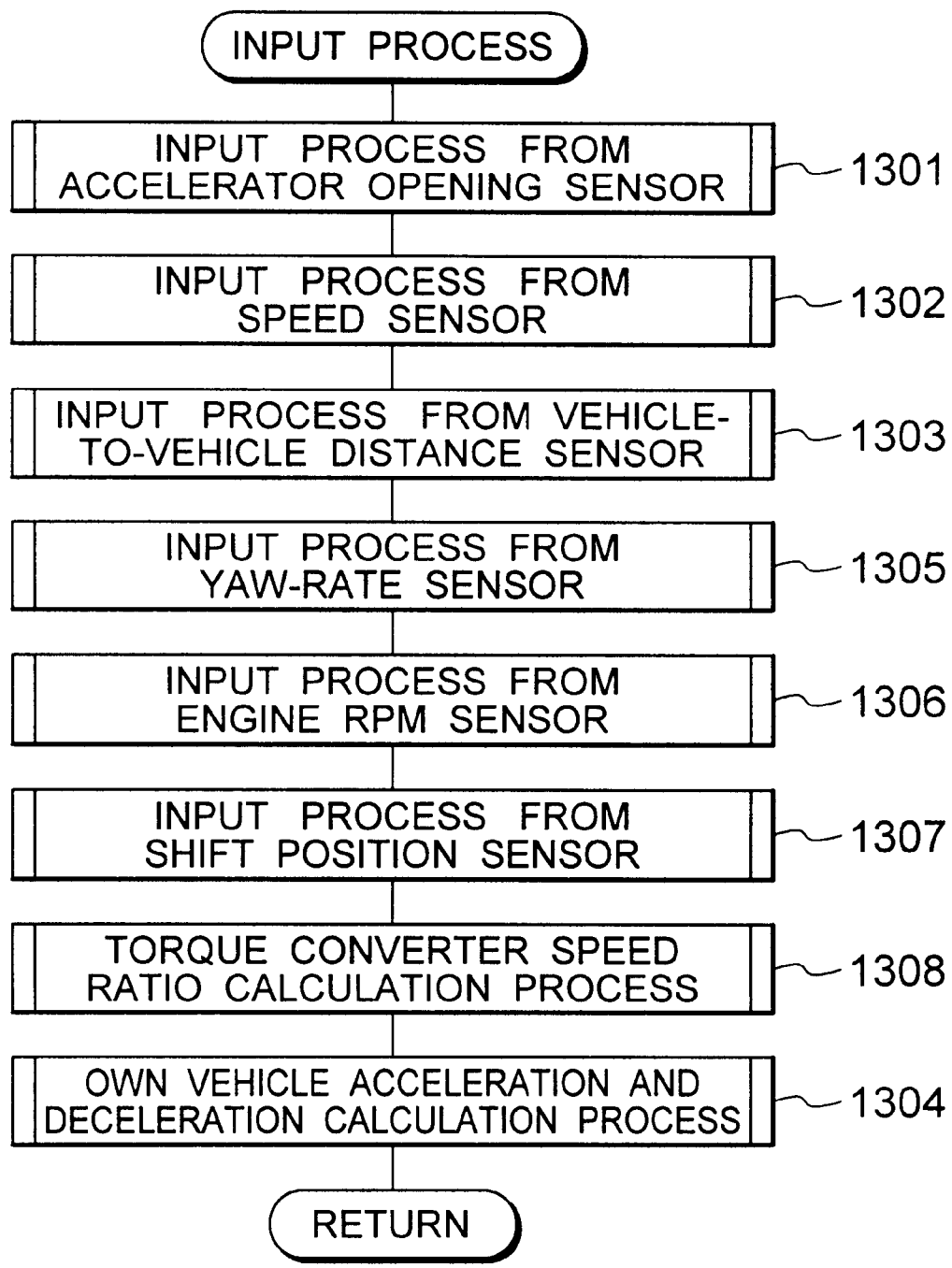
FIG. 18 is a flow diagram showing an input process in accordance with a fourth embodiment of the present invention.
Figure 19:
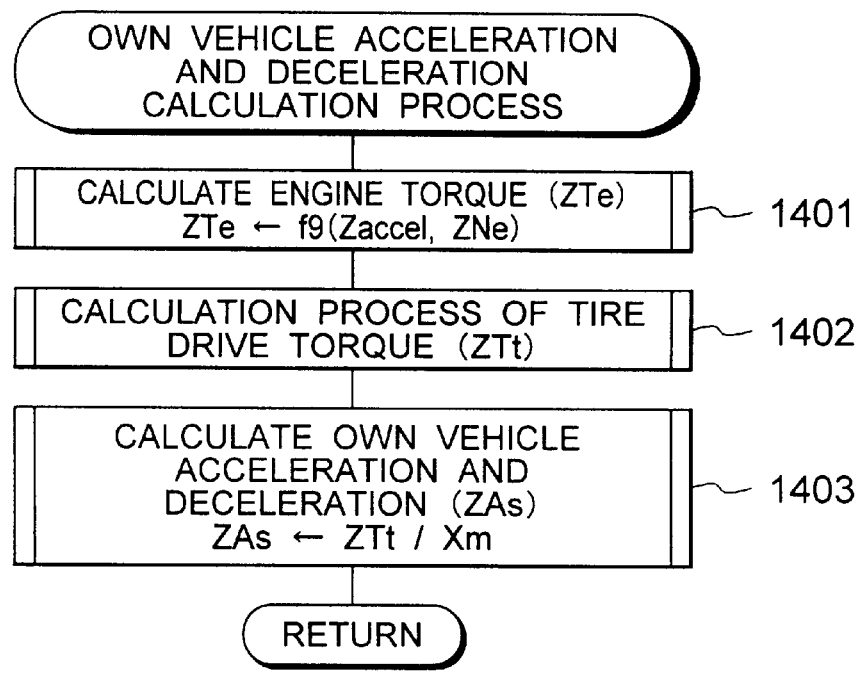
FIG. 19 is a flow diagram showing an own vehicle acceleration and deceleration calculation process in accordance with the fourth embodiment of the present invention.

The construction and program of the follow-up cruise control apparatus of the fourth embodiment are based on those of the first embodiment, and include a modified input process as shown in FIG. 18, and a modified own vehicle acceleration and deceleration calculation process as shown in FIG. 19. Variables ZNe, ZRtrans, ZRtrqcon, ZTe, and ZTt are stored in the storage unit 110, and are readable and rewritable, and data Xm and XRfinal are beforehand stored in the storage unit 110 and are readable only and not rewritable.

The input process in FIG. 18 is performed in steps 1301 through 1305, respectively in the same way as in steps 301 through 305 shown in FIG. 3. In step 1306, the controller 105 receives a signal from the engine RPM sensor 117, and stores the signal as the RPM ZNe of the engine 101. In step 1307, the controller 105 receives a shift position signal from the shift position sensor 116, and converts the shift position signal into a transmission ratio ZRtrans of the automatic transmission 114 and stores the transmission ratio ZRtrans. In step 1308, the controller 105 calculates and stores a speed ratio ZRtrqcon of the torque converter 118, arranged between the engine 101 and the automatic transmission 114, namely, a ratio of an input RPM (=engine RPM) and an output RPM (=RPM of the output shaft of the automatic transmission 114/transmission ratio ZRtrans) of the torque converter 118. The controller 105 goes to step 203, subsequent steps 1301 through 1308.

Figure 20:
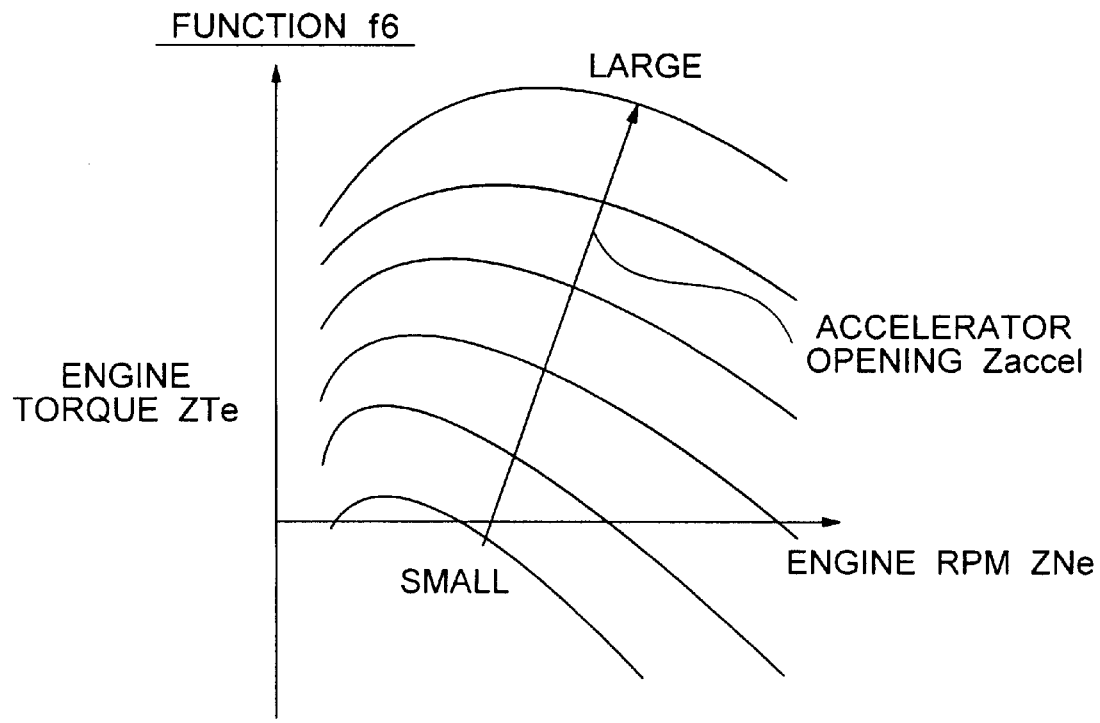
FIG. 20 shows engine torque characteristics, represented by a function f6, in accordance with the fourth embodiment of the present invention.

The own vehicle acceleration and deceleration calculation process in the fourth embodiment is now discussed, referring to FIG. 19. In step 1401, engine torque ZTe is calculated based on the accelerator opening Zaccel and the engine RPM ZNe according to a function f6 as shown in FIG. 20. The function f6 represents engine torque characteristics of the engine 101. In step 1402, the controller 105 calculates a tire driving torque ZTt using the engine torque ZTe, the engine RPM ZNe, the transmission ratio ZRtrans, and the speed ratio ztrqcon of the torque converter according to equation (11).

$$ZTt = ZTe \times ZRtrans \times ZRtrqcon \times XRfinal \tag{11}$$

where ZTe is the engine torque [kgf·m], ZRtrans is the transmission ratio, ZRtrqcon is the torque converter speed ratio, and XRfinal is a final gear ratio.

In step 1403, the controller 105 calculates the own vehicle acceleration and deceleration ZAs based on the tire driving torque ZTt and a vehicle weight Xm according to equation (12).

$$ZAs = ZTt/Xm \tag{12}$$

where ZTt is the tire driving torque [kgf·m], and Xm is the vehicle weight [kg].

In the follow-up cruise control apparatus of the fourth embodiment, the own vehicle acceleration and deceleration ZAS is calculated based on the accelerator opening Zaccel, and states of the engine, the torque converter, and the transmission. In this arrangement, the acceleration-state of own vehicle is detected prior to a change in acceleration and deceleration resulting from the acceleration action by the driver, and a change appears in the safe acceleration and deceleration indicating the degree of risk of collision with the front obstacle prior to a timing of the own vehicle acceleration and deceleration ZAs based on the own vehicle speed ZVs. As a result, the switching timing of the vehicle to be followed-up becomes fast, relieving the driver from having the anxiety of a collision.

In this embodiment, the engine torque ZTe is calculated based on the two variables, i.e., the accelerator opening Zaccel and the engine RPM ZNe. Optionally, the engine torque ZTe may be corrected by variables which play a vital role in the operation of the engine, such as an air-fuel ratio, an ignition timing, and an intake air temperature.

In the fourth embodiment, the tire driving torque ZTt is calculated according to equation (11). The tire driving torque ZTt may be corrected by the inclination of a road, the frictional coefficient of the road surface, the radius of the curve of the road, and the property of the road.

In the fourth embodiment, the own vehicle acceleration and deceleration ZAs is calculated according to equation (12). The vehicle weight Xm may include the weight of passengers.

Fifth Embodiment

Figure 21:
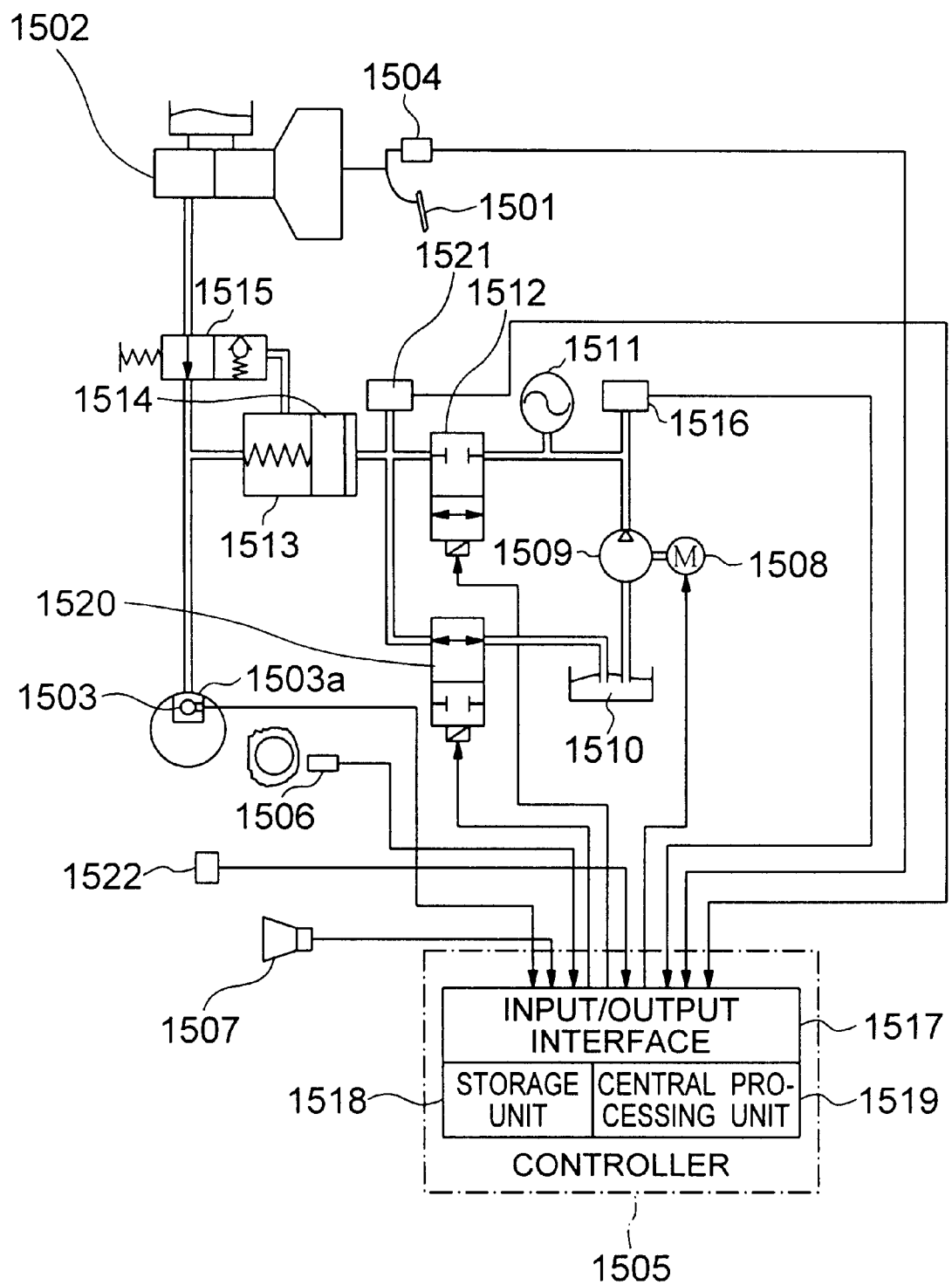
FIG. 21 is a system block diagram of a follow-up cruise control apparatus of a fifth embodiment of the present invention.
Figure 22:
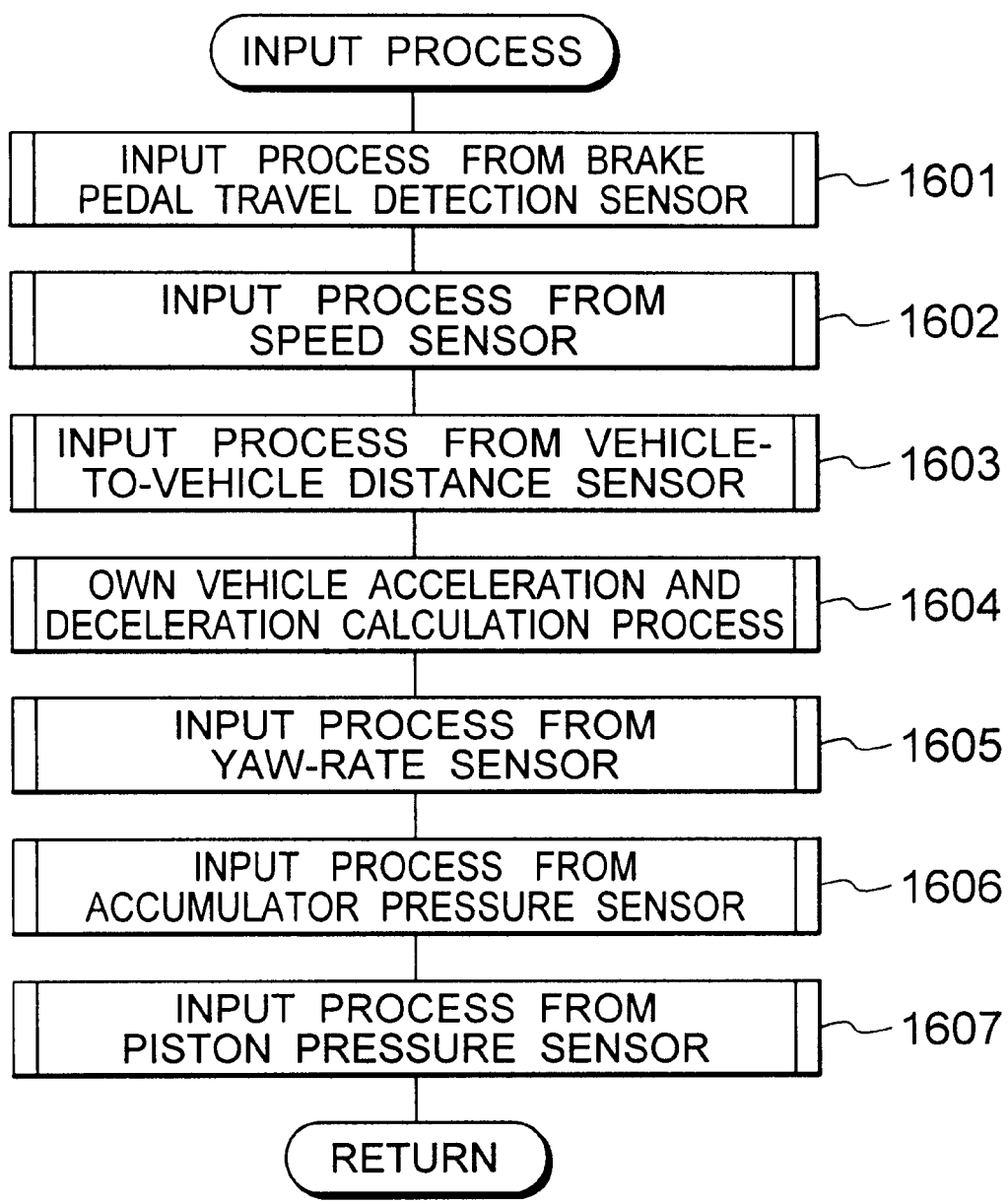
FIG. 22 is a flow diagram showing an input process of the fifth embodiment of the present invention.
Figure 23:
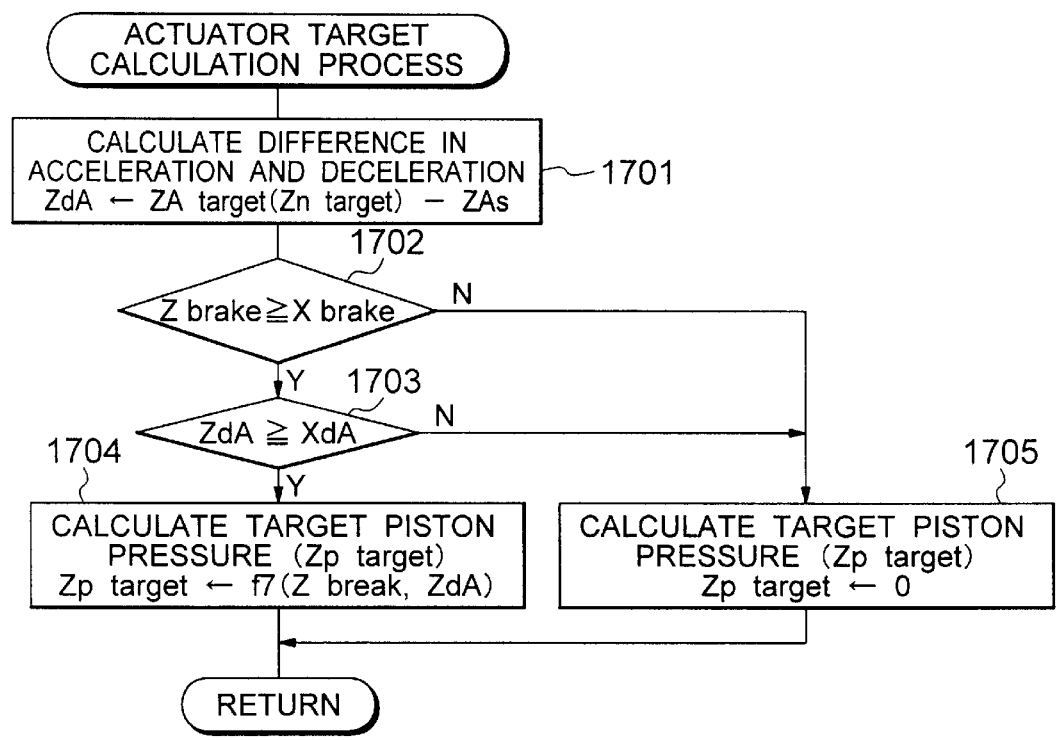
FIG. 23 is a flow diagram showing an actuator target calculation process in accordance with the fifth embodiment of the present invention.
Figure 25:
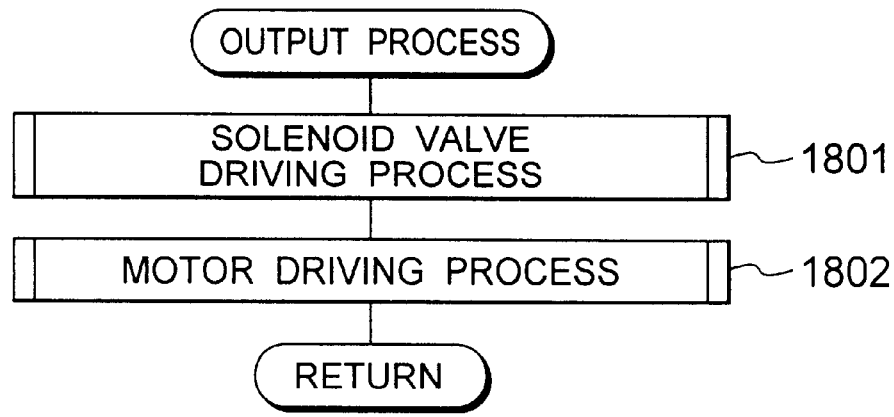
FIG. 25 is a flow diagram showing an output process in accordance with the fifth embodiment of the present invention.
Figure 26:
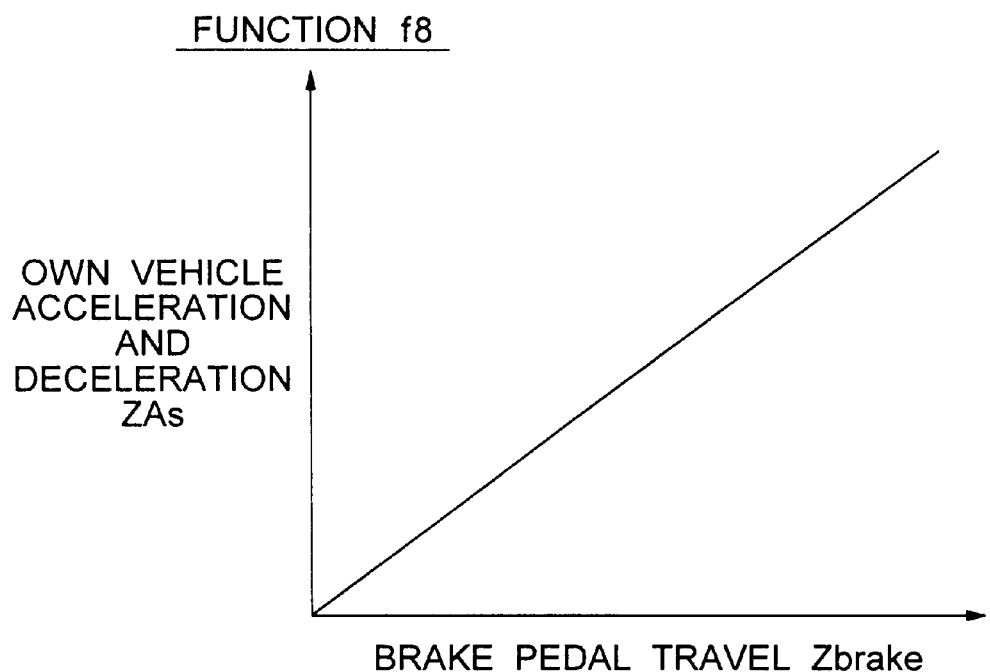
FIG. 26 shows brake pedal travel versus own vehicle acceleration and deceleration characteristics, represented by a function f8, in accordance with a sixth embodiment of the present invention.

A follow-up cruise control apparatus of a fifth embodiment, based on the first embodiment, is arranged as shown in FIG. 21. The program of the apparatus, based on the program of the first embodiment, includes a modified input process as shown in FIG. 22, a modified actuator target calculation process as shown in FIG. 23, and a modified output process as shown in FIG. 25. Zbrake, Zpacc, Zppiston, and zptarget are variables or flags, which are temporarily stored in a storage unit 1518 and are read in a random fashion. Xbrake is data which is beforehand stored in the storage unit 1518 and is readable.

The construction of the apparatus shown in FIG. 21 is now discussed. There are shown a brake pedal 1501, a master cylinder 1502, a wheel cylinder 1503, a brake pedal travel sensor 1504 for detecting the travel of the brake pedal 1501, a speed sensor 1506, a vehicle-to-vehicle sensor 1507 for detecting the traveling direction distance and the lateral distance to a front obstacle using a reflected radio wave or a reflected light beam, a reservoir tank 1510 for holding oil, an accumulator 1511 for storing hydraulic pressure of the oil, a hydraulic pump 1509 for pumping up the oil from the reservoir tank 1510 and maintaining a high hydraulic pressure in the accumulator 1511, a motor 1508 for causing the hydraulic pump 1509 to rotate, an accumulator pressure sensor 1516 for detecting the hydraulic pressure stored in the accumulator 1511, and a cylinder 1513 which adjusts the hydraulic pressure acting on the wheel cylinder 1503 by moving a piston 1514 arranged therewithin. The brake pedal travel sensor 1504 may be a switch for detecting whether the brake pedal is pushed by a predetermined angle, and each of the sensor 1504 and the switch is referred to as the brake state detection element.

There are also shown a high-pressure solenoid valve 1512 which intensifies the hydraulic pressure acting on the piston 1514 with the accumulator 1511 working as a source of the hydraulic pressure, in other words, moves the piston 1514 to the left as shown, a low-pressure solenoid valve 1520 which decreases the hydraulic pressure acting on the piston 1514, on to which the hydraulic pressure is released, in other words, moves the piston 1514 to the right, a piston pressure sensor 1521 for detecting the hydraulic pressure acting on the piston 1514, a check valve 1515 which is interlocked with the movement of the piston 1514 to communicate the wheel cylinder 1503 to the master cylinder 1502 when the hydraulic pressure of the master cylinder 1502 is higher than that of the wheel cylinder 1503, and to disengage the wheel cylinder 1503 from the master cylinder 1502 when the hydraulic pressure of the master cylinder 1502 is lower than that of the wheel cylinder 1503, and a yaw-rate sensor 1522 for detecting the yaw rate of own vehicle. In response to signals from the above sensors, a controller 1505 controls the motor 1508, and the solenoid valves 1512 and 1520. The controller 1505 is composed of a central processing unit 1519 constituting a known microcomputer, a storage unit 1518 and an input and output unit 1517.

The operation of the apparatus thus constructed is now discussed. The brake pedal travel sensor 1504 detects the brake pedal travel and sends the corresponding signal to the controller 1505. The accumulator pressure sensor 1516 detects the hydraulic pressure of the accumulator 1511, and sends the corresponding signal to the controller 1505. The vehicle-to-vehicle sensor 1507 detects the traveling direction distance and lateral distance to the front obstacle, and sends the corresponding signal to the controller 1505. If the driver puts his or her foot down on the brake pedal 1501 when the controller 1505 determines that a sufficient safe distance is maintained to the front obstacle, the master cylinder 1502 operates in response to the brake pedal 1501 in the same manner as in ordinary vehicles, raising the hydraulic pressure in the wheel cylinder 1503, and thereby producing a braking power corresponding to the hydraulic pressure.

When the controller 1505 determines that the driver fails to correctly recognize the front obstacle, possibly for driving asleep, with no safe distance maintained to the front obstacle, the master cylinder 1502 operates in response to the brake pedal 1501, raising the hydraulic pressure in the wheel cylinder 1503. The controller 1505 controls the high-pressure solenoid valve 1512 by a control amount corresponding to a safe acceleration and deceleration based on the distance to the front obstacle, thereby moving the piston 1514 to the left. Along with this motion, the check valve 1515 disengages the master cylinder 1502 from the wheel cylinder 1503. In response to the movement of the piston 1514, the hydraulic pressure in wheel cylinder 1503 generated in response to the brake pedal 1501 is increased more, and a braking power, which is higher than that normally caused by the corresponding braking action, is thus generated.

To shift own vehicle from an unsafe to a safe situation with the front obstacle, the controller 1505 drives the low-pressure solenoid valve 1520 by a control amount corresponding to the safe acceleration and deceleration based on the distance to the front obstacle. The piston 1514 moves to the right. As a result, the hydraulic pressure in the wheel cylinder 1503 is decreased, and the braking power is reduced accordingly. If the hydraulic pressure in the accumulator 1511 drops, the accumulator pressure. sensor 1516 detects a pressure drop. The motor 1508 is operated to maintain the hydraulic pressure in the accumulator 1511.

The input process of the fifth embodiment executed in step 202 shown in FIG. 2 is now discussed. FIG. 22 is a flow diagram showing a program of the input process. In step 1601, the controller 1505 receives a signal from the brake pedal travel sensor 1504 and stores the signal as a brake pedal travel Zbrake of the brake pedal 1501. Steps 1602 through 1605 performs the same processing steps in steps 302 through 305 shown in FIG. 3. In step 1606, the controller 1505 receives a signal from the accumulator pressure sensor 1516, and stores the signal as an accumulator pressure Zpacc. In step 1607, the controller 1505 receives a signal from the piston pressure sensor 1521 and stores the signal as a piston pressure Zppiston. The controller 1505 then goes to step 203 shown in FIG. 2, subsequent to the above steps 1601 through 1607.

The actuator target calculation process of the fifth embodiment executed in step 209 shown in FIG. 2 is now discussed. FIG. 23 is a flow diagram showing a program of the actuator target calculation process. In step 1701, the controller 1505 calculates an acceleration and deceleration difference between the own vehicle acceleration and deceleration ZAs and the traveling direction target acceleration and deceleration ZAtarget(n) based on the front obstacle Zntarget selected through the front obstacle selection process, and stores the acceleration and deceleration difference as a variable ZdA. In step 1702, the controller 1505 determines whether the brake pedal travel Zbrake is not smaller than a predetermined value Xbrake, namely, whether the brake pedal 1501 is pressed. If the relationship Zbrake≧Xbrake is found to hold, the controller 1505 goes to step 1703 to determine whether the acceleration and deceleration difference ZdA is not smaller than XdA, namely, whether the relationship ZdA≧XdA holds.

Figure 24:
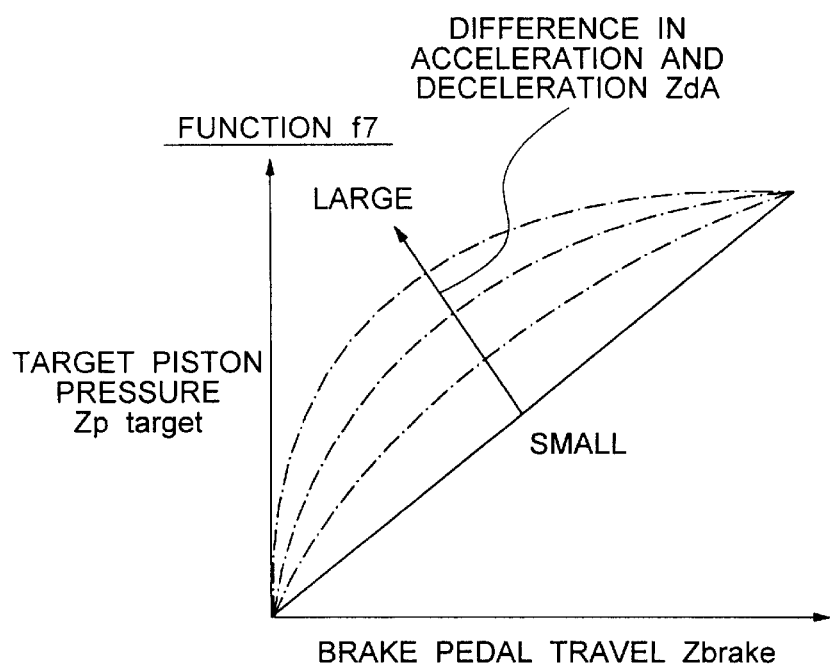
FIG. 24 is a flow diagram showing brake pedal travel versus target piston pressure characteristics, represented by a function f7, in accordance with the fifth embodiment of the present invention.

If the relationship ZdA≧XdA is found to hold, the controller 1505 goes to step 1704. The controller 1505 calculates a target piston pressure Zptarget based on the brake pedal travel Zbrake of the brake pedal 1501 and the safe acceleration and deceleration Zα according to a function f7 as shown in FIG. 24. According to the function f7, the target piston pressure Zptarget is proportional to the brake pedal travel Zbrake, and varies with the magnitude of the acceleration and deceleration difference ZdA as shown in FIG. 24. As the possibility of the collision of own vehicle with the front obstacle is higher, the target piston pressure Zptarget is set to be higher, and the braking power becomes higher. If the relationship of Zbrake≧Xbrake does not hold, or if the relationship ZdA≧XdA is not found to hold, the controller 1505 goes to step 1705, and zero is entered as the target piston pressure zptarget. When the target piston pressure is set to be zero, the piston is moved to the initial position thereof (the right end of the cylinder 1513 as shown in FIG. 21). The wheel cylinder pressure, thus the braking power, corresponds to the brake pedal travel of the brake pedal 1501. The controller 1505 goes to step 210 shown in FIG. 2, subsequent to the above steps 1701 through 1705.

The output process executed in step 210 shown in FIG. 2 is now discussed. FIG. 25 is a flow diagram showing a program of the output process. In step 1801, the controller 1505 drives the high-pressure solenoid valve 1512 and the low-pressure solenoid valve 1520 in response to the present accumulator pressure Zpacc and the present piston pressure zppiston to reach the target piston pressure zptarget calculated through the actuator target calculation process. In step 1802, the accumulator pressure sensor 1516 detects a pressure drop when the hydraulic pressure in the accumulator 1511 drops below a predetermined value, and the controller 1505 causes the motor 1508 to rotate as necessary to maintain the pressure in the accumulator 1511. Subsequent to the above steps 1801 and 1802, the controller 1505 returns to step 202 shown in FIG. 2 to repeat the above processing steps every predetermined intervals.

The follow-up cruise control apparatus of the fifth embodiment calculates the own vehicle traveling direction acceleration and deceleration ZAtarget(n) to maintain a predetermined distance to each of the front obstacles present ahead of own vehicle, and multiplies the traveling direction acceleration and deceleration ZAtarget(n) by the weight coefficient determined by the distance ZdisLat between the front obstacle and the center line of the own vehicle course, and treats the product as the safe acceleration and deceleration Zα(n). The follow-up cruise control apparatus selects the front obstacle having the safe acceleration and deceleration Zα(n) indicating the highest degree of risk of collision, from among the front obstacles. Based on the acceleration and deceleration difference between the safe acceleration and deceleration of the front obstacle and the own vehicle acceleration and deceleration ZAs, the follow-up cruise control apparatus controls the braking power of own vehicle, which is normally uniquely determined by the braking operation by the driver.

With this arrangement, as in the first embodiment, own vehicle selects, as a vehicle to be followed-up, a front vehicle presenting the highest degree of risk of collision to own vehicle, or selects a front vehicle which the driver desire to follow-up under each of the conditions 1 through 4. When own vehicle safely runs following the vehicle being followed-up (Zα<Xα), a braking hydraulic pressure corresponds to the brake pedal travel input by the driver. The braking power, dependent on the driver's braking action only, is generated. When own vehicle fails to unsafely run following the vehicle being followed-up (Zα≧Xα), the braking hydraulic pressure is controlled in response to the magnitude of the safe acceleration and deceleration Zα according to the braking hydraulic pressure characteristics represented by the function f7. As a result, the braking power is amplified, and the follow-up cruise control apparatus prevents own vehicle from dangerously closely approaching or colliding with the front obstacle, thereby assuring a safe driving of the vehicle.

The fifth embodiment of the present invention thus provides the same advantages as those of the first embodiment.

The follow-up cruise control apparatus of the fifth embodiment increases the braking power by adjusting the piston pressure acting on the piston 1514 while monitoring the piston pressure through the piston pressure sensor 1521. Instead of the piston pressure sensor 1521, a wheel cylinder pressure sensor 1503a (see FIG. 21) may be arranged to detect the pressure acting in the wheel cylinder 1503. The braking power is thus controlled by monitoring the wheel cylinder pressure through the wheel cylinder pressure sensor 1503a.

The follow-up cruise control apparatus of the fifth embodiment intensifies the accumulator pressure, as a source, through a piston mechanism (including the piston 1514 and the cylinder 1513), thereby enhancing the braking power. The present invention is not limited to this arrangement. The present invention may employ a diversity of braking power control methods. For instance, the piston mechanism (including the piston 1514 and the cylinder 1513) may be dispensed with in FIG. 21. Alternatively, the accumulator 1511, the hydraulic pump 1509, the motor 1508, the high-pressure solenoid valve 1512, the low-pressure solenoid valve 1520, and the reservoir tank 1510 may be dispensed with, and the position of the piston 1514 may be electrically controlled to adjust the wheel cylinder pressure. Alternatively, the accumulator 1511, the hydraulic pump 1509, the motor 1508, the high-pressure solenoid valve 1512, the low-pressure solenoid valve 1520, the reservoir tank 1510, the cylinder 1513, the piston 1514, and the check valve 1515 may be dispensed with, and the piston in the master cylinder may be electrically controlled to adjust the wheel cylinder pressure.

Alternatively, the accumulator 1511, the hydraulic pump 1509, the motor 1508, the high-pressure solenoid valve 1512, the low-pressure solenoid valve 1520, the reservoir tank 1510, the cylinder 1513, the piston 1514, and the check valve 1515 may be dispensed with, and a master bag, arranged between the brake pedal 1501 and the master cylinder 1502, for controlling a negative pressure may be acceptable. The master bag amplifies the driver's pedal force acting on the brake pedal 1501. Braking may be activated by causing the force of a motor to press a brake disk, which integrally rotating with the tire.

In step 1701 in the fifth embodiment, the apparatus calculates the acceleration and deceleration difference between the own vehicle acceleration and deceleration ZAs and the traveling direction target acceleration and deceleration ZAtarget(n) based on the front obstacle zntarget selected through the front obstacle selection process, and stores the acceleration and deceleration difference as the variable ZdA. Alternatively, the apparatus may calculate the acceleration and deceleration difference between the own vehicle acceleration and deceleration ZAs and the safe acceleration and deceleration Zα(n) based on the front obstacle Zntarget selected through the front obstacle selection process, and may store the difference as the variable ZdA.

Sixth Embodiment

The construction and program of a follow-up cruise control apparatus of a sixth embodiment is based on those of the fifth embodiment, and includes a modification in the own vehicle acceleration and deceleration process. In the own vehicle acceleration and deceleration calculation process described above, a derivative of the own vehicle speed ZVs is stored as the own vehicle acceleration and deceleration ZAs. In the own vehicle acceleration and deceleration calculation process of the sixth embodiment, however, the own vehicle acceleration and deceleration ZAs is determined by the brake pedal travel Zbrake according to a function f8 as shown in FIG. 24. According to the function f8, as the brake pedal travel Zbrake becomes larger, the own vehicle acceleration and deceleration ZAs become larger.

The follow-up cruise control apparatus of the third embodiment calculates the own vehicle acceleration and deceleration As in relation to the brake pedal travel Zbrake. In this arrangement, the acceleration-state of own vehicle is detected prior to a change in acceleration and deceleration resulting from the braking action by the driver, and a change appears in the safe acceleration and deceleration indicating the degree of risk of collision with the front obstacle prior to a timing of the own vehicle acceleration and deceleration ZAs based on the own vehicle speed ZVs. As a result, the switching timing of the vehicle to be followed-up becomes fast, relieving the driver from having the anxiety of a collision.

In the sixth embodiment, the own vehicle acceleration and deceleration ZAs are calculated based on the brake pedal travel Zbrake only. Optionally, the own vehicle acceleration and deceleration ZAs may be corrected by variables which play a vital role in the own vehicle acceleration and deceleration, such as the engine RPM ZNe, whether the supply of a fuel to the engine is cut off, the transmission ratio ZRtrans, the own vehicle speed Zvs, the vehicle weight Xm, the number of passengers, the inclination of the road, and the frictional coefficient of the road surface.

Seventh Embodiment

Figure 27:
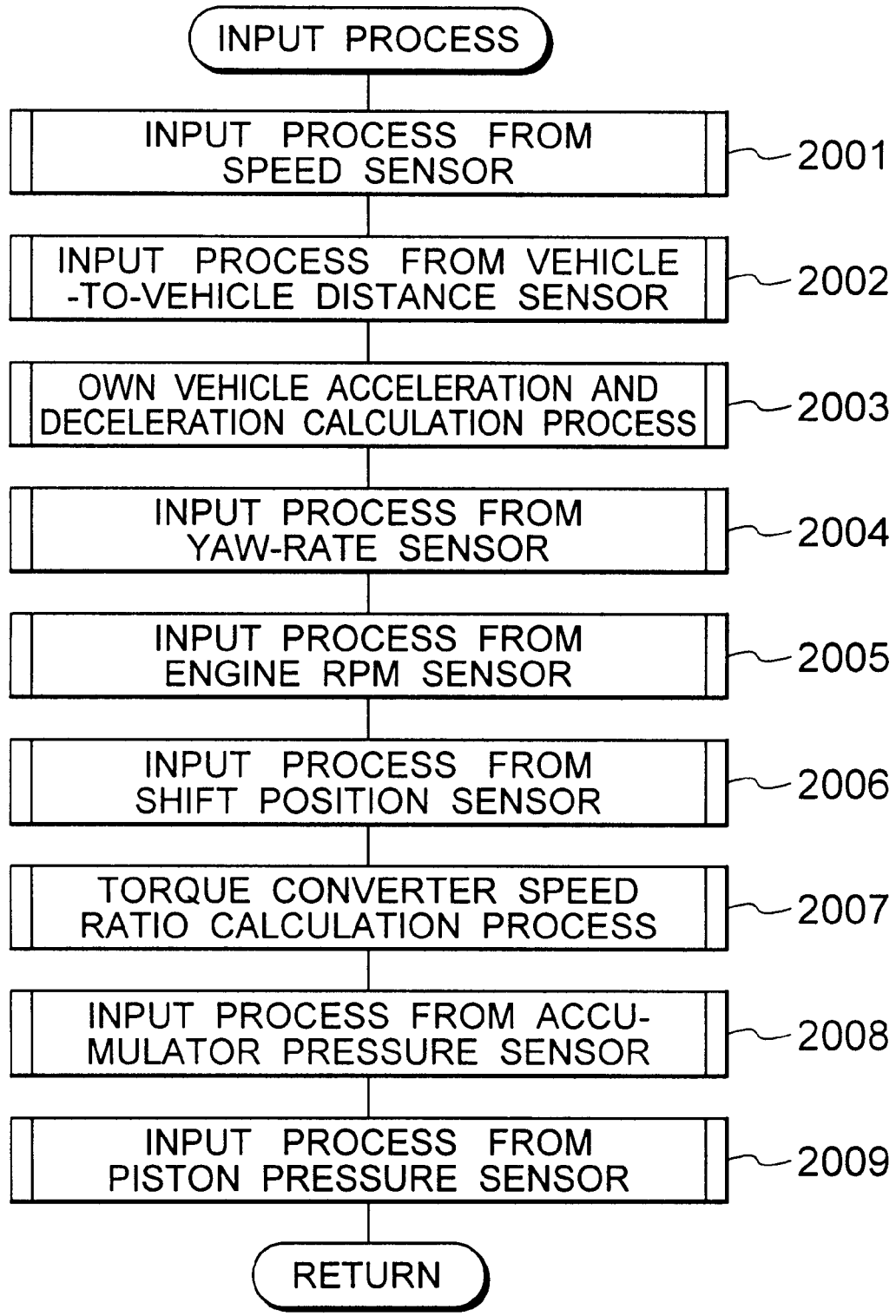
FIG. 27 is a flow diagram showing an input process in accordance with a seventh embodiment of the present invention.
Figure 28:
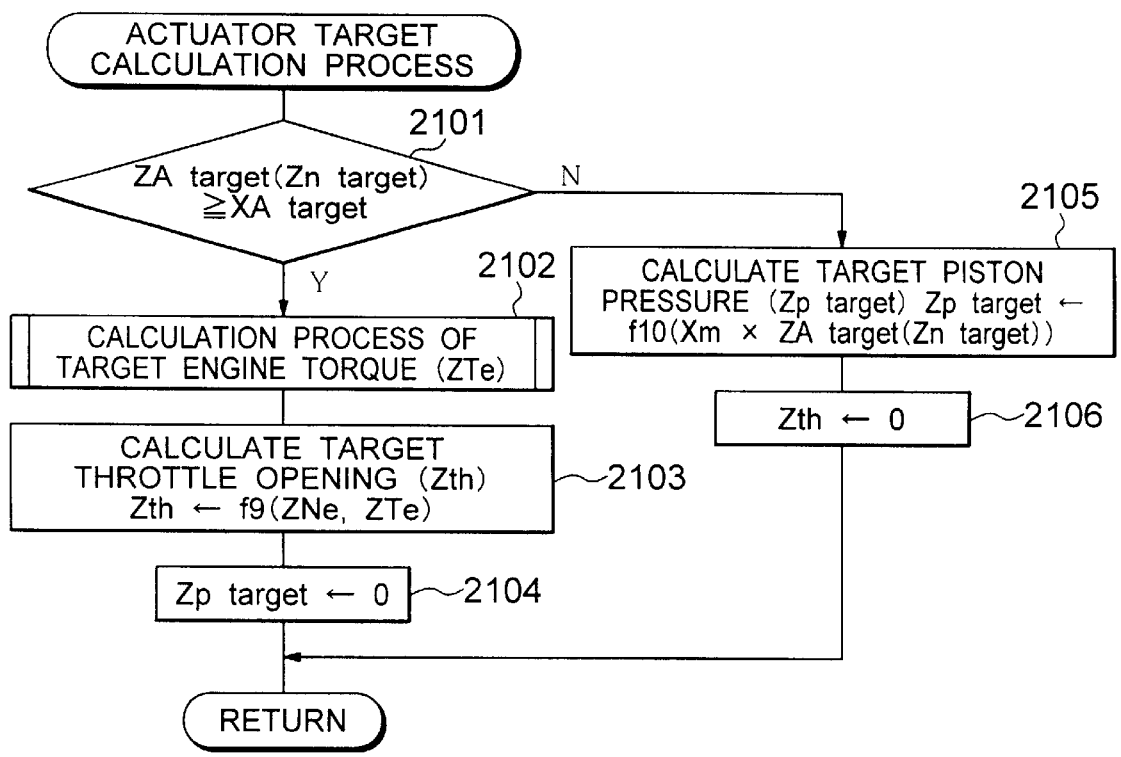
FIG. 28 is a flow diagram showing an actuator target calculation process in accordance with the seventh embodiment of the present invention.
Figure 31:
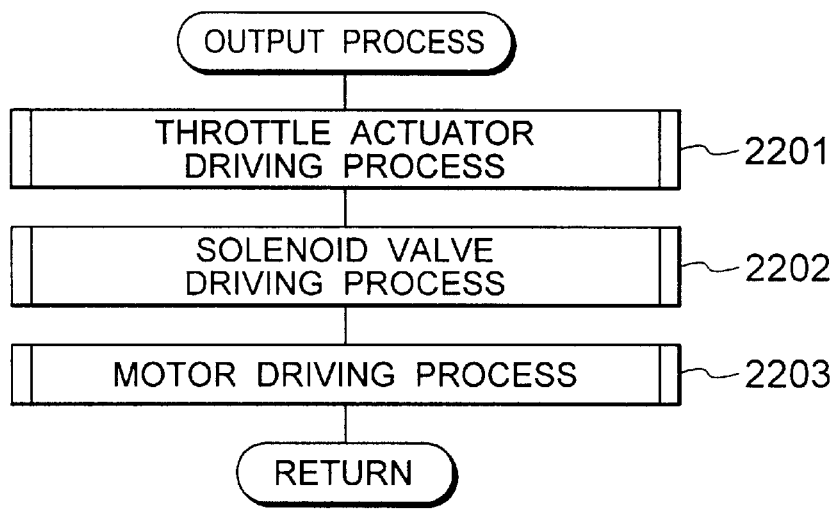
FIG. 31 is a flow diagram showing an output process in accordance with the seventh embodiment of the present invention.

A follow-up cruise control apparatus of a seventh embodiment is based on the first embodiment and the fifth embodiment, and the construction of the apparatus of the seventh embodiment is shown in FIG. 1 and FIG. 21. Sensors, switches and actuators are connected to a single controller. The program of the apparatus is based on the program of the first embodiment, and includes a modified input process as shown in FIG. 27, a modified actuator target calculation process as shown in FIG. 28, and an output process as shown in FIG. 31. Zpacc, Zppiston, and Zptarget, to be discussed later, are variables or flags which are temporarily stored in the storage unit 1518 and are read in a random fashion, and XAtarget is data which is beforehand stored in the storage unit 1518 and is readable.

In the input process shown in FIG. 27, the controller receives a speed signal output by the speed sensor 108 and stores the speed signal as the own vehicle speed zvs in step 2001. In step 2002, the controller receives a signal from the vehicle-to-vehicle distance sensor 106, and stores a relative distance to the front obstacle in the travel direction of own vehicle. The method of storing the distance remains identical to that of the first embodiment. In step 2003, the controller stores a derivative of the own vehicle speed ZVs as a acceleration and deceleration ZAs. In step 2004, the controller receives a signal from the yaw-rate sensor 119 and stores the signal as the yaw rate Zr of the yaw-rate sensor 119.

In step 2005, the controller receives a signal from the engine RPM sensor 117 and stores the signal as the RPM ZNe of the engine 101. In step 2006, the controller receives a shift position signal from the shift position sensor 116, converts the shift position signal into a transmission ratio ZRtrans of the automatic transmission 114, and stores the transmission ratio ZRtrans. In step 2007, the controller calculates and stores a speed ratio ZRtrqcon of the torque converter 118, arranged between the engine 101 and the automatic transmission 114, namely, a ratio of an input RPM (=engine RPM) and an output RPM (=RPM of the output shaft of the automatic transmission 114/transmission ratio ZRtrans) of the torque converter 118.

In step 2008, the controller receives a signal from the accumulator pressure sensor 1516 and stores the signal as the accumulator pressure Zpacc. In step 2009, the controller receives a signal from the piston pressure sensor 1521 and stores the signal as the piston pressure Zppiston. The controller goes to step 203 shown in FIG. 2, subsequent to the above steps 2001 through 2009.

The actuator target calculation process of the seventh embodiment is discussed, referring to a flow diagram shown in FIG. 28. In step 2101, the controller determines whether the own vehicle traveling direction target acceleration and deceleration ZAtarget (Zntarget) is not smaller than a predetermined acceleration and deceleration XAtarget in connection with the front obstacle selected through the front obstacle selection process, in other words, whether the relationship ZAtarget (Zntarget)≧XAtarget holds. XAtarget is set to an acceleration and deceleration, which is obtained by fully opening the throttle actuator. If the relationship ZAtarget (Zntarget)≧XAtarget holds, the controller goes to step 2102 to calculate a target engine torque ZTe based on the engine RPM ZNe, the safe acceleration and deceleration Zα, the transmission ratio ZRtrans, and the speed ratio Ztrqcon of the torque converter, according to equation (13).

$$ZTe=(Xm \times Z\alpha)/(ZRtrans \times ZRtrqcon \times XRfinal) \tag{13}$$

where Xm represents the vehicle weight [kg], Zα represents the safe acceleration and deceleration [m/s$^2$](=traveling direction target acceleration and deceleration ZAtarget), ZRtrans represents the transmission ratio, ZRtrqcon is the speed ratio of the torque converter, and XRfinal represents a final gear ratio.

Figure 29:
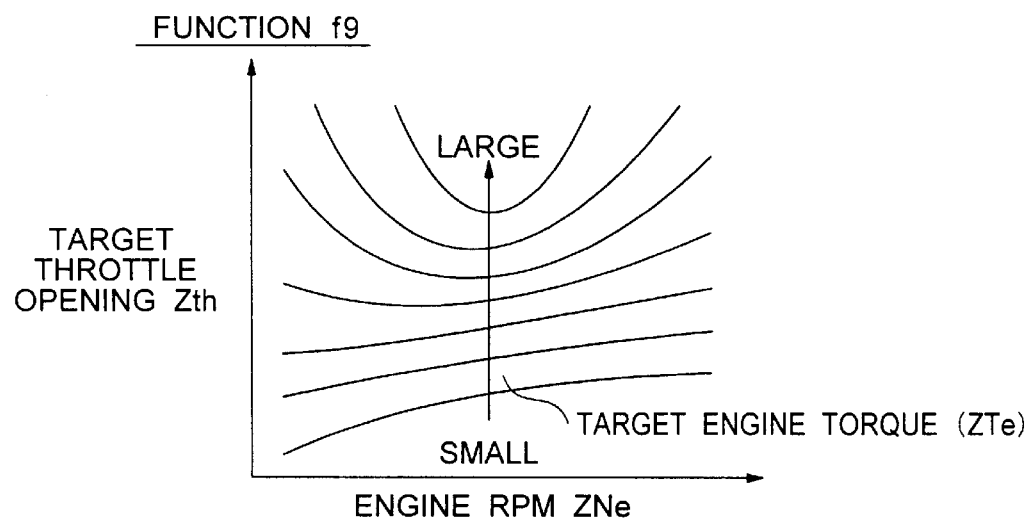
FIG. 29 shows target engine torque versus target throttle opening characteristics, represented by a function f9, in accordance with the seventh embodiment of the present invention.

In step 2103, the controller calculates a target throttle opening Zth based on the engine RPM ZNe and the target engine torque ZTe, according to a function f9 shown in FIG. 29. The function f9 is a two-dimensional lookup table having the characteristics shown in FIG. 29. Given the engine RPM ZNe and the target engine torque ZTe, a throttle opening, able to output the target engine torque ZTe, is determined. In step 2104, the controller sets the target piston pressure Zptarget to zero so that a brake actuator (including the high-pressure solenoid valve 1512 and the low-pressure solenoid valve 1520) is not driven during the driving of the throttle actuator 104.

Figure 30:
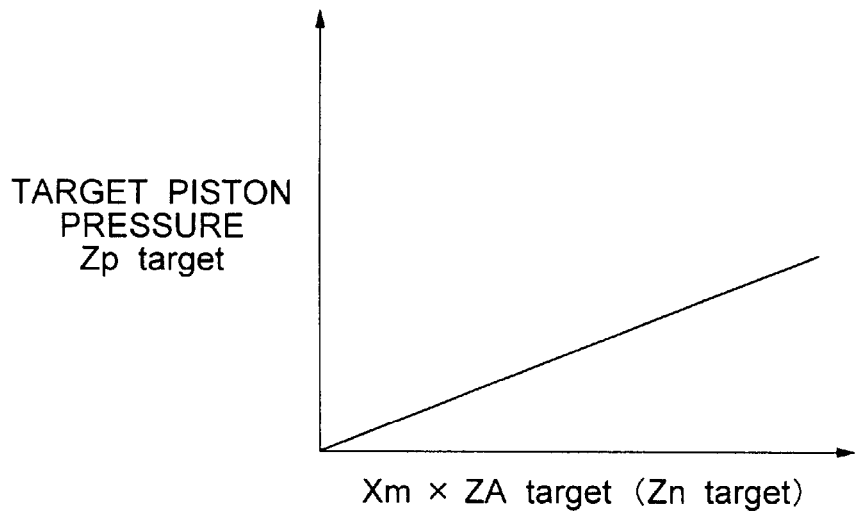
FIG. 30 shows traveling direction target acceleration and deceleration versus target piston pressure characteristics, represented by a function f10, in accordance with the seventh embodiment of the present invention.

When it is determined in step 2101 that the relationship ZAtarget (Zntarget)≧ZAtarget fails to hold, the controller goes to step 2105. Based on the product of the traveling direction target acceleration and deceleration ZAtarget (Zntarget) and the vehicle weight Xm, the controller calculates the target piston pressure Zptarget according to a function f10 as shown in FIG. 30. The product of the traveling direction target acceleration and deceleration ZAtarget (Zntarget) and the vehicle weight Xm corresponds to a tire braking power. According to the function f10, the target piston pressure for achieving a tire braking power outputting the traveling direction target acceleration and deceleration ZAtarget is set. In step 2106, the controller sets the target throttle opening Zth to zero so that the throttle actuator 104 is not driven during the driving of the brake actuator. The controller goes to step 210 shown in FIG. 2, subsequent to the above steps 2001 through 2006.

The output process in step 210 shown in FIG. 2 is now discussed. FIG. 31 is a flow diagram of a program of the output process. In step 2201, the controller adjusts the throttle valve 103 by driving the throttle actuator 104, in response to the target throttle opening Zth calculated through the actuator target calculation process. In step 2202, the controller drives the high-pressure solenoid valve 1512 and the low-pressure solenoid valve 1520 in response to the present accumulator pressure Zpacc and the present piston pressure Zppiston to achieve the target piston pressure Zptarget calculated through the actuator target calculation process. If the hydraulic pressure in the accumulator 1511 drops, the accumulator pressure sensor 1516 detects a pressure drop instep 2203. The motor 1508 is operated to maintain the hydraulic pressure in the accumulator 1511. Subsequent to the above steps 2201 through 2203, the controller returns to step 202 shown in FIG. 2 to repeat the above processing steps at the predetermined regular intervals.

The follow-up cruise control apparatus of the seventh embodiment calculates the own vehicle traveling direction acceleration and deceleration ZAtarget(n) to maintain a predetermined distance to each of the front obstacles present ahead of own vehicle, and multiplies the traveling direction acceleration and deceleration ZAtarget(n) by the weight coefficient determined by the distance ZdisLat between the front obstacle and the center line of the own vehicle course, and treats the product as the safe acceleration and deceleration Zα(n). The follow-up cruise control apparatus selects the front obstacle having the safe acceleration and deceleration Zα(n) indicating the highest degree of risk of collision, from among the front obstacles. Based on the traveling direction acceleration and deceleration ZAtarget (Zntarget) to the selected front obstacle, the apparatus controls the driving power and the braking of own vehicle, thereby automatically adjusting the distance to the front vehicle being followed-up. The follow-up cruise control apparatus of the seventh embodiment provides the same advantages as those of the first embodiment.

In the seventh embodiment, the target engine torque ZTe is calculated according to equation (13). The target engine torque ZTe may be corrected by the inclination of a road, the frictional coefficient of the road surface, the radius of the curve of the road, and the property of the road. The vehicle weight Xm may include the weight of passengers.

In the seventh embodiment, the target throttle opening Zth is calculated based on the two variables, namely, the target engine torque ZTe and the engine RPM ZNe. Furthermore, the target throttle opening Zth may be corrected by the variables which play a vital role in the operation of the engine, such as an intake air temperature, an air-fuel ratio, and an ignition timing.

In the seventh embodiment, the target piston pressure zptarget is calculated based on the safe acceleration and deceleration, namely, the product of the own vehicle traveling direction target acceleration and deceleration ZAtarget and the vehicle weight. Furthermore, the target piston pressure Zptarget may be corrected by the inclination of a road, the frictional coefficient of the road surface, the radius of the curve of the road, and the property of the road.

Eighth Embodiment

The construction of an eighth embodiment includes a steering angle sensor 119a (see FIG. 1) instead of the yaw rate sensor in the preceding embodiments. The yaw rate is determined according to equation (14).

$$Zr = ZVs/ZR = ZVs \times \delta/X1/(1+A \cdot ZVs^2) = ZVs \times (Z\theta str \times \pi/180/Zgearstr)/X1/(1+A \cdot AVs^2) \quad (14)$$

where Zr is the yaw rate [rad/s], ZVs is the own vehicle speed [m], δ is a real steering angle of the tire [rad], X1 is a wheel base of own vehicle [m], A is a stability factor, Zθstr is a steering angle [deg], and Zgearstr is a gear ratio from the steering column to the tire.

This arrangement provides the same advantages as with the yaw rate sensor employed.

Ninth Embodiment

The control and program of a follow-up cruise control apparatus of a ninth embodiment includes a modification in the relative speed calculation process of the preceding embodiments. In preceding embodiments, a derivative of the distance Zx(n) is stored as the relative speed ZVr. In the relative speed calculation process of the ninth embodiment, a relative speed sensor or a vehicle-to-vehicle distance sensor capable of detecting a distance and a relative speed (each referred to as a sensor 106a as shown in FIG. 1) is arranged to detect the relative speed. The sensor 106a directly detects the distance and relative speed to the front obstacle referring to the reflected state of a radio wave or a light ray.

With this arrangement, an accurate relative speed is obtained compared with means for calculating a relative speed based on a distance, and an acceleration and deceleration to the front obstacle closer to a real value is obtained. An accurate safe acceleration and deceleration thus results, and the apparatus prevents own vehicle from dangerously closely approaching or colliding with the front obstacle, thereby assuring a safe driving of the vehicle.

The follow-up cruise control apparatus of the present invention includes the vehicle-to-vehicle distance sensor for detecting the relative distance of own vehicle to each of front obstacles including the plurality of vehicles present ahead of own vehicle, the speed sensor for detecting the speed of own vehicle, the traveling direction target acceleration and deceleration calculating unit for calculating traveling direction target acceleration and deceleration to optimize the distance to the front obstacle, based, at least, on the own vehicle speed and the relative distance to the front obstacle, the safe acceleration and deceleration calculating unit for calculating safe acceleration and deceleration indicating the degree of risk of collision with the front obstacle, based on at least the traveling direction acceleration and deceleration, the unit for applying the traveling direction target acceleration and deceleration calculating unit and the safe acceleration and deceleration calculating unit to each of the plurality of front obstacles, detected by the vehicle-to-vehicle distance sensor, the front obstacle selecting unit for selecting the front obstacle having a safe acceleration and deceleration with the highest degree of risk of collision, from among the plurality of the front obstacles, and the vehicle control unit for controlling a driving power or a braking power of own vehicle, based on the safe acceleration and deceleration or the traveling direction target acceleration and deceleration, to the front obstacle selected by the front obstacle selecting unit. The apparatus thus selects the vehicle having the highest degree of risk of collision as a vehicle to be followed-up, and frees the driver from feeling the anxiety of a collision. Since this arrangement needs no means for detecting the change of lane by own vehicle and the front obstacle, the apparatus and the calculation process corresponding to the means are simplified.

The vehicle control unit includes the actuator for electrically adjusting the driving power of own vehicle to control own vehicle to a specified target driving power, the acceleration and deceleration calculating unit for calculating an acceleration and deceleration based on the speed of own vehicle, the acceleration-state detection element for detecting an acceleration control amount input by the driver, the target driving power calculating unit for calculating the target driving power, based on at least the acceleration and deceleration of own vehicle, the acceleration control amount, and the safe acceleration and deceleration or the traveling direction target acceleration and deceleration, to the front obstacle selected by the front obstacle selecting unit, and the output unit for outputting the target driving power to the actuator. Since the driving power of own vehicle is thus controlled, the same advantages as described above are provided.

The vehicle control unit includes the actuator for electrically adjusting the braking power of own vehicle to control own vehicle to a specified target braking power, the acceleration and deceleration calculating unit for calculating and acceleration and deceleration based on the speed of own vehicle, the braking-state detection element for detecting a brake control amount input by the driver, the target braking power calculating unit for calculating the target braking power, based on, at least, the acceleration and deceleration of own vehicle, the brake control amount, and the safe acceleration and deceleration or the traveling direction target acceleration and deceleration, to the front obstacle selected by the front obstacle selecting unit, and the output unit for outputting the target braking power to the actuator. Since the braking power of own vehicle is thus controlled, the same advantages as described above are provided.

The vehicle control unit includes the actuator for electrically adjusting the driving power of own vehicle to control own vehicle to a specified target driving power, the target driving power calculating unit for calculating the target driving power to control own vehicle to, at least, the safe acceleration and deceleration or the traveling direction target acceleration and deceleration, to the front obstacle selected by the front obstacle selecting unit, and the output unit for outputting the target driving power to the actuator. Since the driving power of own vehicle is thus controlled, the same advantages as described above are provided.

The vehicle control unit includes the actuator for electrically adjusting the braking power of own vehicle to control own vehicle to a specified target braking power, the target braking power calculating unit for calculating the target braking power to control own vehicle to, at least, the safe acceleration and deceleration or the traveling direction target acceleration and deceleration, to the front obstacle selected by the front obstacle selecting unit, and the output unit for outputting the target braking power to the actuator. Since the braking power of own vehicle is thus controlled, the same advantages as described above are provided.

The safe acceleration and deceleration calculating unit includes the weight coefficient calculating unit for calculating a weight coefficient based on at least the relative distance to the front obstacle, and the unit for correcting the traveling direction target acceleration and deceleration by the weight coefficient and treating the corrected value as the safe acceleration and deceleration. The apparatus thus selects the front obstacle having the highest degree of risk of collision, based on the safe acceleration and deceleration corrected with the weight coefficient.

The weight coefficient calculating unit includes the yaw-rate sensor for detecting a yaw rate of own vehicle, the course calculating unit for calculating an orbital curve along which own vehicle runs at least at the yaw rate, and the unit for calculating a weight coefficient based on at least a distance between the orbital curve and a front obstacle. The apparatus determines the weight coefficient, based on the distance between the orbital curve resulting from the yaw rate and the front obstacle.

The weight coefficient calculating unit includes the yaw-rate sensor for detecting a yaw rate of own vehicle, the distance calculating unit for calculating a predicted distance to the front obstacle in a lateral direction a predetermined duration of time later, based on at least the yaw rate and the output signal from the vehicle-to-vehicle distance sensor, and the unit for calculating the weight coefficient, based on the distance to the front obstacle the predetermined duration of time later. The apparatus thus determines the weight coefficient, based on the predicted distance to the front obstacle a predetermined duration of time later.

Since the predetermined duration of time is a predicted time to a collision with the front obstacle, a proper weight coefficient thus results.

Since the predetermined duration of time is based on the speed of own vehicle, a proper weight coefficient thus results.

The acceleration and deceleration calculating unit includes the acceleration-state detection element for detecting an acceleration control amount input by the driver, and the calculating unit for calculating the acceleration and deceleration of own vehicle, in response to at least an acceleration operation by the driver. With this arrangement, the switching timing of the vehicle to be followed-up becomes fast.

The acceleration and deceleration calculating unit includes the braking-state detection element for detecting a braking control amount input by the driver, and the calculating unit for calculating the acceleration and deceleration of own vehicle, in response to at least an braking operation by the driver. With this arrangement, the switching timing of the vehicle to be followed-up becomes fast.

The follow-up cruise control apparatus of the present invention includes the steering angle sensor for detecting a steering control amount input by the driver, instead of the yaw-rate sensor, and the calculating unit for calculating the yaw rate of own vehicle, based on the steering control amount. With this arrangement, the yaw rate is derived from the steering control amount.

The follow-up cruise control apparatus of the present invention includes the vehicle-to-vehicle distance sensor which concurrently detects the distance to the front obstacle and the relative speed to the front obstacle. With this arrangement, the acceleration and deceleration of the front obstacle closer to the real one results, and thus an accurate acceleration and deceleration is obtained.

What is claimed is:

1. A follow-up cruise control apparatus comprising:
   a vehicle-to-vehicle distance sensor for detecting a relative distance of own vehicle to each of front obstacles including a plurality of vehicles present ahead of own vehicle;
   a speed sensor for detecting a speed of own vehicle;
   traveling direction target acceleration and deceleration calculating means for calculating traveling direction target acceleration and deceleration to optimize a distance to the front obstacle, based on, at least, the own vehicle speed and the relative distance to the front obstacle;
   safe acceleration and deceleration calculating means for calculating safe acceleration and deceleration indicating the degree of risk of collision with the front obstacle, based on at least the traveling direction acceleration and deceleration;
   means for applying the traveling direction target acceleration and deceleration calculating means and the safe acceleration and deceleration calculating means to each of the plurality of front obstacles, detected by the vehicle-to-vehicle distance sensor;
   front obstacle selecting means for selecting a front obstacle having a safe acceleration and deceleration with the highest degree of risk of collision, from among the plurality of the front obstacles; and
   vehicle control means for controlling a driving power or a braking power of own vehicle, based on, at least, the safe acceleration and deceleration or the traveling direction target acceleration and deceleration, to the front obstacle selected by the front obstacle selecting means.

2. The follow-up cruise control apparatus according to claim 1, wherein the vehicle control means comprises:
   an actuator for electrically adjusting the driving power of own vehicle to control own vehicle to a specified target driving power;
   acceleration and deceleration calculating means for calculating an acceleration and deceleration based on the speed of own vehicle;
   acceleration-state detection element for detecting an acceleration control amount input by a driver;
   target driving power calculating means for calculating the target driving power, based on, at least, the acceleration and deceleration of own vehicle, the acceleration control amount, and the safe acceleration and deceleration or the traveling direction target acceleration and deceleration, to the front obstacle selected by the front obstacle selecting means; and
   output means for outputting the target driving power to the actuator.

3. The follow-up cruise control apparatus according to claim 2, wherein the acceleration and deceleration calculating means comprises:
   an acceleration-state detection element for detecting an acceleration control amount input by a driver; and
   calculating means for calculating the acceleration and deceleration of own vehicle, in response to at least an acceleration operation by a driver.

4. The follow-up cruise control apparatus according to claim 1, wherein the vehicle control means comprises:
   an actuator for electrically adjusting the braking power of own vehicle to control own vehicle to a specified target braking power;
   acceleration and deceleration calculating means for calculating an acceleration and deceleration based on the speed of own vehicle;
   braking-state detection element for detecting a brake control amount input by a driver;
   target braking power calculating means for calculating the target braking power, based on, at least, the acceleration and deceleration of own vehicle, the brake control amount, and the safe acceleration and deceleration or the traveling direction target acceleration and deceleration, to the front obstacle selected by the front obstacle selecting means; and
   output means for outputting the target braking power to the actuator.

5. The follow-up cruise control apparatus according to claim 4, wherein the acceleration and deceleration calculating means comprises:
   a braking-state detection element for detecting a braking control amount input by a driver; and
   calculating means for calculating the acceleration and deceleration of own vehicle, in response to at least an braking operation by a driver.

6. The follow-up cruise control apparatus according to claim 1, wherein the vehicle control means comprises:
   an actuator for electrically adjusting the driving power of own vehicle to control own vehicle to a specified target driving power;
   target driving power calculating means for calculating the target driving power to control own vehicle to, at least, the safe acceleration and deceleration or the traveling direction target acceleration and deceleration, to the front obstacle selected by the front obstacle selecting means; and
   output means for outputting the target driving power to the actuator.

7. The follow-up cruise control apparatus according to claim 1, wherein the vehicle control means comprises:
   an actuator for electrically adjusting the braking power of own vehicle to control own vehicle to a specified target braking power;
   target braking power calculating means for calculating the target braking power to control own vehicle to, at least, the safe acceleration and deceleration or the traveling direction target acceleration and deceleration, to the front obstacle selected by the front obstacle selecting means; and
   output means for outputting the target braking power to the actuator.

8. The follow-up cruise control apparatus according to claim 1, wherein the safe acceleration and deceleration calculating means comprises:
   weight coefficient calculating means for calculating a weight coefficient, based on, at least, the relative distance to the front obstacle; and
   means for correcting the traveling direction target acceleration and deceleration by the weight coefficient and treating the corrected value as the safe acceleration and deceleration.

9. The follow-up cruise control apparatus according to claim 8, wherein the weight coefficient calculating means comprises:
   a yaw-rate sensor for detecting a yaw rate of own vehicle;

course calculating means for calculating an orbital curve along which own vehicle runs at least at the yaw rate; and means for calculating the weight coefficient based on at least a distance between the orbital curve and the front obstacle.

10. The follow-up cruise control apparatus according to claim 9, comprising:

a steering angle sensor for detecting a steering control amount input by a driver, instead of the yaw-rate sensor; and calculating means for calculating the yaw rate of own vehicle, based on the steering control amount.

11. The follow-up cruise control apparatus according to claim 8, wherein the weight coefficient calculating means comprises:

a yaw-rate sensor for detecting a yaw rate of own vehicle;

distance calculating means for calculating a predicted distance to the front obstacle in a lateral direction a predetermined duration of time later, based on, at least, the yaw rate and the output signal from the vehicle-to-vehicle distance sensor; and means for calculating the weight coefficient, based on the predicted distance to the front obstacle the predetermined duration of time later.

12. The follow-up cruise control apparatus according to claim 11, wherein the predetermined duration of time is a predicted time to a collision with the front obstacle.

13. The follow-up cruise control apparatus according to claim 11, wherein the predetermined duration of time is based on the speed of own vehicle.

14. The follow-up cruise control apparatus according to claim 11, comprising:

a steering angle sensor for detecting a steering control amount input by a driver, instead of the yaw-rate sensor; and calculating means for calculating the yaw rate of own vehicle, based on the steering control amount.

15. The follow-up cruise control apparatus according to claim 1, comprising a vehicle-to-vehicle distance sensor which concurrently detects the distance to the front obstacle and the relative speed to the front obstacle.

* * * * *